(12) United States Patent
Roy et al.

(10) Patent No.: US 6,342,195 B1
(45) Date of Patent: Jan. 29, 2002

(54) METHOD FOR SYNTHESIZING SOLIDS SUCH AS DIAMOND AND PRODUCTS PRODUCED THEREBY

(75) Inventors: Rustum Roy; Russell Messier; Hardial S. Dewan; Andrzej Badzian; Palaniappan Ravindranathan, all of State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 08/788,000

(22) PCT Filed: Oct. 1, 1993

(86) PCT No.: PCT/US93/09436

§ 371 Date: Apr. 3, 1995

§ 102(e) Date: Apr. 3, 1995

(87) PCT Pub. No.: WO94/07613

PCT Pub. Date: Apr. 14, 1994

Related U.S. Application Data

(63) Continuation of application No. 08/411,840, filed as application No. PCT/US93/09436 on Oct. 1, 1993.

(51) Int. Cl.$^7$ .............................................. G01B 31/06
(52) U.S. Cl. ...................... 423/446; 264/432; 427/249
(58) Field of Search .................. 423/446; 427/249; 264/432

(56) References Cited

U.S. PATENT DOCUMENTS

| | | | |
|---|---|---|---|
| 3,423,177 A | 1/1969 | Bovenkerk | 423/446 |
| 3,630,679 A | 12/1971 | Angus | 23/209.1 |
| 3,661,526 A | 5/1972 | Angus et al. | 23/209.1 |
| 4,003,956 A | * 1/1977 | Hilfman | 585/270 |
| 4,522,680 A | 6/1985 | Ogawa | 423/446 |
| 4,695,446 A | * 9/1987 | Bogdanaic | 423/658.2 |
| 4,734,267 A | 3/1988 | Kojima | 156/617.1 |
| 4,806,198 A | 2/1989 | Jagota et al. | 156/623 R |
| 4,882,138 A | 11/1989 | Pinneo | 423/446 |
| 4,981,717 A | 1/1991 | Thaler | 423/446 |
| 5,075,094 A | 12/1991 | Morrish et al. | 423/446 |
| 5,075,095 A | 12/1991 | Pinneo | 423/446 |
| 5,080,752 A | 1/1992 | Kabacoff et al. | 423/446 |
| 5,087,434 A | 2/1992 | Frenklach et al. | 423/446 |
| 5,087,435 A | 2/1992 | Potter et al. | 423/446 |
| 5,167,945 A | 12/1992 | Ogawa et al. | 423/447.2 |
| 5,199,972 A | * 4/1993 | Bogdanaic | 423/658.2 |
| 5,298,106 A | 3/1994 | Kabacoff et al. | 423/446 |
| 5,334,339 A | 8/1994 | Nakashima et al. | 423/290 |
| 5,449,531 A | * 9/1995 | Zhu et al. | 423/446 |

FOREIGN PATENT DOCUMENTS

| | | | |
|---|---|---|---|
| DE | 1131645 | 6/1962 | |
| EP | 417924 | 3/1991 | 423/446 |
| GB | 2058840 | 4/1981 | 423/290 |
| JP | 4930357 | 8/1974 | 423/290 |
| JP | 4197431 | 7/1992 | |
| WO | 8304408 | 6/1983 | |

* cited by examiner

*Primary Examiner*—Stuart L. Hendrickson
(74) *Attorney, Agent, or Firm*—Edward W. Goebel, Jr.; MacDonald, Illig, Jones and Britton LLP

(57) ABSTRACT

The present invention relates generally to methods for the synthesis of various solids such as diamonds, diamonds films, boron nitride and other similar materials. This invention specifically relates to utilizing novel sources of reaction species (e.g., in the case of diamond formation, novel sources of carbon and/or hydrogen and/or seeds) for the manufacture of various materials and the use of such materials for various commercial purposes.

21 Claims, 28 Drawing Sheets

METHOD FOR SYNTHESIZING SOLIDS SUCH AS DIAMOND AND PRODUCTS PRODUCED THEREBY

This application is a continuation of abandoned copending application Ser. No. 08/411,480 filed on Apr. 3, 1995 which is a national stage application of PCT US93/09436, filed Oct. 1, 1993.

CROSS REFERENCE TO RELATED PATENT APPLICATIONS

The patent application is a continuation-in-part application of abandoned patent application filed on Aug. 27, 1993, entitled "A Method for Synthesizing Solids Such as Diamond and Products Produced Thereby", and which was filed in the names of Rustum Roy et al., which in turn is a continuation-in-part of an application filed on Oct. 19, 1992, entitled "A Method for Synthesizing Solids Such as Diamond and Products Produced Thereby", and which was filed in the names of Rustum Roy et al., which in turn is a continuation-in-part application of abandoned U.S. patent application Ser. No. 07/962,423, filed on Oct. 16, 1992, entitled "A Method for Synthesizing Solids Such as Diamond and Products Produced Thereby", and which was filed in the names of Rustum Roy et al., and now abandoned, which in turn is a continuation-in-part application of abandoned U.S. patent application Ser. No. 07/955,956, filed Oct. 2, 1992, entitled "A Method for Synthesizing Solids Such as Diamond and Products Produced Thereby", filed in the name of Rustum Roy, and now abandoned.

This invention was made with United States of America Government support under Contract No. N00019-91- J-4023 awarded by the Defense Advanced Research Projects Agency (DARPA). The United States of America Government has certain rights in the invention.

TECHNICAL FIELD

The present invention relates generally to methods for the synthesis of various solids such as diamonds, diamond films, boron nitride and other similar materials. This invention specifically relates to utilizing novel sources of reaction species (e.g., in the case of diamond formation, novel sources of carbon and/or hydrogen and/or seeds) for the manufacture of various materials and the use of such materials for various commercial purposes.

BACKGROUND ART

There are various known methods for producing synthetic diamond. In a first method, diamond grit may be synthesized by precipitating diamond from carbon contained within a metal solution at high temperatures (e.g., 1400° C.,) and high pressures (e.g., 60 Kbar). The resulting diamond which is produced at these high temperatures and high pressures may be free of second phase inclusions, but generally contains significant concentrations of dissolved nitrogen and metal (e.g., nickel, iron, cobalt, etc.).

In a second technique, diamond powder may be produced by shock wave synthesis, wherein an explosive charge is utilized to shock a mixture of carbon and a metal solvent/catalyst. An example of the shock wave synthesis technique can be found in U.S. Pat. No. 3,401,019, which issued on Sep. 10, 1968, in the names of Cowan et al. Drawbacks of the shock wave synthesis procedure are that the diamond which is produced is routinely contaminated with dissolved nitrogen metal (e.g., iron). In addition, the recovery of diamond particles produced requires elaborate chemical processing to separate the diamond particles from the surrounding materials within the reaction chamber (e.g., graphite and metal). Moreover, this method typically produces only submicron diamond powders.

In a third technique, diamond powder can be made by precipitation of diamond within certain amorphous metals which are saturated with carbon. For example, U.S. Pat. No. 4,485,080 to Shingu et al., which issued on Nov. 27, 1984, describes a multi-step process for the rapid solidification of carbon-containing alloys followed by the precipitation of diamond particles within the amorphous metal at temperatures above 100° C. The diamond is thereafter recovered from the metal by acid digestion.

In a more recent development, thin diamond films are synthesized from the vapor phase by an activated chemical vapor deposition (CVD) process. Typically, during such CVD processes, diamond particles nucleate on the surface of an appropriate substrate heterogeneously and thereafter grow in size. The particles thus produced may be widely separated or may be close enough to coalesce into a continuous diamond film. Exemplary techniques showing various aspects of the CVD process can be found in the following patents: U.S. Pat. No. 4,882,138, which issued on Nov. 21, 1989, in the name of John Pinneo, which discloses the use of the combination of diamond particles, atomic hydrogen and a gaseous carbon source, which, when processed, results in diamond being epitaxially deposited on the diamond particles; U.S. Pat. No. 4,958,590, which issued on Sep. 25, 1990, in the name of Robert Goforth, which discloses a specific microwave assisted CVD process and apparatus; U.S. Pat. No. 4,985,227, which issued on Jan. 15, 1991, in the names of Ito et al., which discloses contacting a substrate material with a gaseous source of excited carbon monoxide and excited hydrogen and causing diamond to be deposited onto the substrate; and U.S. Pat. No. 5,112,643, which issued on May 12, 1992, in the names of Ikegaya et al., which discloses the use of a raw material gas which includes a carbon source and hydrogen and activating the raw material gas by a thermoelectron-radiating device and by formation of a DC plasma which results in the deposition of a diamond film on the surface of the substrate. In addition, the CVD process for the formation of diamonds has been reviewed by R. C. DeVries, Annual Review of Materials Sciences 17:161 (1987); A. R. Badzian and R. C. DeVries, Mat. Res. Bull. 23:385 (1988); and J. C. Angus and C. C. Hayman, Science 241:915 (1988). The art further shows that graphite can be a source material for the formation of various gaseous carbon-based species which are capable of depositing on a large, single crystal of diamond, B. V. Spitsyn, L. L. Bouilov and B. V. Derjaguin, Prog. Crystal Growth and Charact. 17:79 (1988). However, no one has to date used the principle of CVD processing to form any object other than a polycrystalline diamond film.

Another technique for the formation of diamond is disclosed in U.S. Pat. No. 4,997,636, which issued on Mar. 5, 1991, in the name of Johan Prins. This patent discloses the use of a non-diamond substrate material having a face-centered cubic crystal structure. The substrate is ion implanted with carbon atoms which are later induced to diffuse out of the substrate and grow epitaxially on a surface of the substrate.

A still further technique for the formation of diamond utilizes a combustion flame. Specifically, U.S. Pat. No. 5,075,096, which issued on Dec. 24, 1991, in the names of Tanabe et al. discloses burning a combustible gas containing carbon in a combustion-supporting gas which contains oxygen to create a reduction atmosphere, and precisely controlling the humidity of the reduction atmosphere, and inserting a substrate into the combustible gas flame to form diamond on a surface of the substrate; and U.S. Pat. No. 5,135,730, which issued on Aug. 4, 1992, in the names of Suzuki et al, discloses forming and burning a mixed gas of a hydrocarbon fuel gas and oxygen to form a flame and contacting the flame with the surface of a substrate to form diamond on said substrate.

All of the above-discussed techniques for the production of diamond suffer from one or more of the following drawbacks: high cost of manufacture, complex production equipment, limited sizes and shapes for diamond production, etc. The present invention overcomes the above described disadvantages inherent in various methods known in the art for the synthesis of diamond and other materials. The invention presents a novel method for the manufacture of various materials including, but not limited to, diamond films, shaped diamond products, boron nitride films, shaped boron nitride products, etc.

SUMMARY OF THE INVENTION

The present invention relates to a novel process for the manufacture of various solids including diamond films, shaped diamond products, boron nitride films, shaped boron nitride products, silicon films, shaped silicon carbide products, etc. With regard to the synthesis of diamond, the process of the invention is a significant improvement over known formation techniques such as high temperature/high pressure reactions, solid precipitation reactions, shock wave synthesis, CVD techniques, combustion flame techniques, etc. The present invention utilizes a novel combination of starting materials and processing conditions to result in novel materials (e.g., diamond). Specifically, with regard to diamond formation, the combination of one or more starting source(s) of carbon in a non-vapor form (e.g., certain solids liquids including, but not limited to, amorphous carbon, carbon black, carbon powder, carbon fibers, graphite, charcoal, polymer materials containing carbon, glassy carbon non-vapor carbon precursor materials, etc.) with one or more appropriate seed material(s) present in addition to the starting source of carbon or inherently present in the starting source of carbon, said seed material(s) having a diamond or diamond-like crystalline structure (e.g., diamond crystals, silicon, silicon carbide, cBN, various face-centered cubic structures which are similar to the crystal lattice of diamond, or other isostructual materials, etc.) and/or one or more seed material precursors which, under the process conditions of the invention, may form one or more seed materials in situ (e.g., Ni, Cu, Mo, Zr, Pt, Pd, etc.) may, when heated to a suitable temperature (e.g., 300° C.–2000° C., and more preferably 300° C.–1600° C. and even more preferably 700° C.–1000° C.) in the presence of a suitable atmosphere, either externally supplied or internally created (e.g., hydrogen and other atmospheres such as argon, nitrogen carbon, oxygen and mixtures thereof) which do not need to exceed about $1.01325 \times 10^5$ Pa (one (1) atmosphere) of pressure, or even pressures greater than $1.01325 \times 10^5$ Pa (one atmosphere), form diamond materials as coatings or as free-standing (i.e., self-supporting) bodies of various desirable sizes and shapes.

Suitable starting material mixtures for use in connection with the present invention may be formed by many conventional techniques including simply mixing solid materials together in a homogeneous or non-homogeneous manner. Such mixing may include many traditional mixing processes such as dry mixing processes (e.g., ball milling) traditional wet mixing processes, etc. A particularly preferred method for mixing solids together is known as the nanocomposite formation technique. The description of nanocomposite formation technique are well known in the literature as set forth in the following references, the subject matter of which are herein expressly incorporated by reference: Rustum Roy, Sol-Gel Processes: Origins, Problems, Products, Am. Ceram. Soc. Bull. 60:383 (1981); Rustum Roy, New Hybrid Materials made by Sol-Gel Technique, Bull. Am Ceram. Soc. 61:374 (1982); Rustum Roy, Ceramics from Solutions: Retrospect and Prospect, Mat. Res. Soc. Annual Mtg. Abstracts, p. 370 (1982); Rustum Roy, New Metal-Ceramic Hybrid Xerogels, Mat. Res. Soc. Annual Mtg. Abstracts, p 377 (1982); Rustum Roy, Ceramics by the solution-Sol-Gel Route, Science 238:1664–1669 (1987); Rustum Roy, S. Komarneni and W. Yarbrough, Some New Advances with SSG-Derived Nanocomposites, Chapter 42, Ultrastructure Processing of Advanced Ceramics, John Mackenzie and Don Ulrich (eds.), Wiley Interscience, pp. 571–588 (1988). However, in many instances, very desirable products can be formed without the need for the homogeneous mixing offered by the nanocomposite formation technique.

Many different apparatuses may be suitable for use in connection with processing the starting materials of the present invention. Some primary considerations in choosing acceptable processing apparatuses may include, for example, the ability of the apparatus to contain a controlled atmosphere and the ability to heat, at least locally, the starting materials to a sufficiently high temperature so as to permit reactions according to the present invention to occur. Accordingly, acceptable processing apparatuses include, for example, chemical vapor deposition apparatuses which are assisted by such means as, for example, microwave generator apparatuses, radio frequency generator apparatuses, filament heating apparatuses, direct heating apparatuses, etc. In addition, with regard to diamond formation, the present invention may also function acceptably in the presence of hydrogen or acetylene flames either contained within a controlled atmosphere area or not contained in a controlled atmosphere vessel.

It should be understood that this disclosure focuses primarily on the production of diamond coatings and various diamond shapes. However, despite such focus, it should be clear to an artisan of ordinary skill that the concepts of the invention translate directly in numerous parallel material systems (e.g., boron nitride), each of which material systems should be benefitted by this invention in a similar manner.

OBJECTS OF THE INVENTION

An object of the invention is to develop a new process for the manufacture of various compositions of films (e.g., diamond) using starting materials in a non-vapor form (e.g., a non-vapor source of carbon for diamond film formation).

It is a further object of the invention to develop a process for the manufacture of various self-supporting bodies (e.g., diamond) to net or near-net shape using starting materials in non-vapor form (e.g., a non-vapor source of carbon for self-supporting diamond structures).

It is also an object of the invention to develop a process for the synthesis of various materials (e.g., diamond), which process can be conducted in various reactors including CVD reactors assisted by microwave, radiowave, etc., hot-filament reactors and in the case of diamond, in the presence of a hydrogen or an acetylene flame, either contained or not contained within a closed environment.

It is also an object the invention to manufacture cubic boron nitride from an appropriate non-vapor starting material.

DETAILED DESCRIPTION

Figure 1:
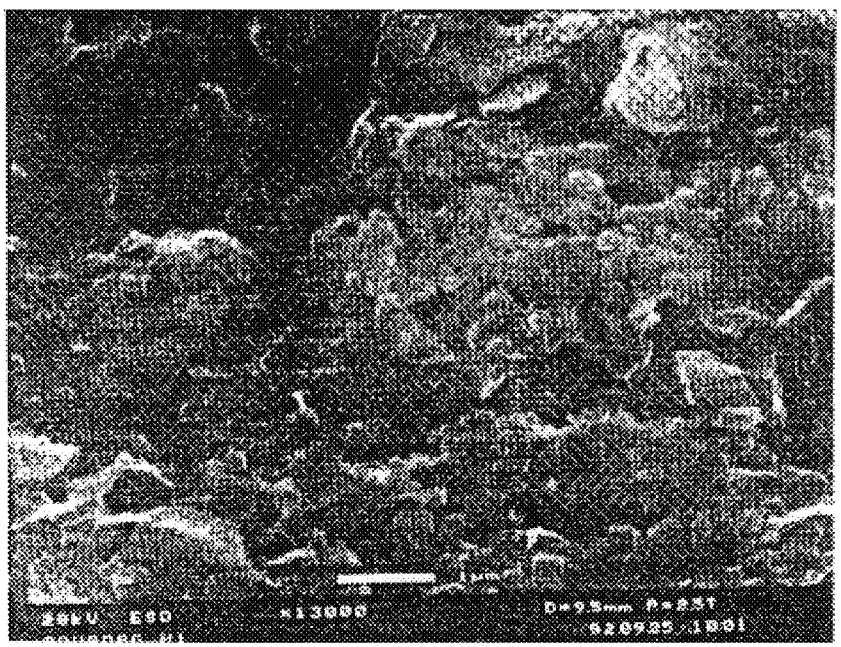
FIG. 1 is an SEM photomicrograph taken at about 13000X of a typical carbon-source material used in comparative Example 2.

Detailed embodiments of the present invention are herein disclosed. However, it should be understood that the disclosed preferred embodiments are merely illustrative of the invention which may be embodied in many forms. Accordingly, specific details disclosed herein are not to be interpreted as limiting, but merely as support for the invention, as claimed, and as representative examples for teaching one skilled in the art to employ the present invention in an appropriately detailed fashion.

The present invention relates generally to a novel process for the formation of coatings or films on appropriate substrate materials. The present invention further relates generally to a novel process for the formation of shaped self-supporting materials. Common to each of the preferred embodiments of the invention is the utilization of certain non-vapor starting materials which are processed in a novel manner.

When the present invention is utilized to form a desirable coating on an appropriate substrate material a first step in the process of the present invention is to form an appropriate mixture of materials which is to be coated onto the substrate material. Some important considerations which may be taken into account in forming such mixtures include: (1) the homogeneity of the mixture; (2) the particulate size of the materials in the mixture (e.g., in some embodiments very fine particulate less than a micron in size are desirable, whereas in other embodiments, much larger particulate is desirable); (3) reactivities of the materials in the mixture with each other or other materials exposed to the mixture during processing of the mixture; and (4) the need, in certain cases, for a binder to assist in holding the mixture together during processing thereof. Each of these considerations is discussed in greater detail below.

Likewise, when the present invention is utilized to form a self-supporting (e.g., free-standing) shaped material, each of the above-discussed considerations may also be important. However, depending upon the particular thickness and complexity of shape of a body to be formed, some additional considerations may be necessary to be taken into account. Such additional considerations may include: (1) the ability to shape the starting material utilized in the invention into a suitable configuration; (2) the ability for the starting material to maintain its shape during processing thereof so as to permit the formation of net or near-net shaped materials (i.e., the size and shape of the resulting body corresponds substantially to the size and shape of the starting material); and (3) the ability, if desired, for the starting material to maintain at least some porosity for at least a portion of the processing thereof, to permit a vapor phase species, when used, to interact with, for example, at least a portion of the non-vapor phase shaped starting material, each of which additional considerations are discussed in greater detail below.

The starting materials which comprise either the coating or the self-supporting body typically include at least two materials or alternatively comprises a single material which performs a dual role. The first material, which typically is present in a greater amount, functions as a source material and the second material, which typically is present in a lesser amount, functions as a seed material. The source material may contain one or more additional materials which favorably influence physical, mechanical, electrical, etc., properties of the final body. The phrase "source material" in this context should be understood as meaning one or more material(s) which is/are capable, under the process conditions of the invention, of interacting with one or more seed material(s) and/or one or more seed material precursor(s), to grow one or more species from one or more surfaces of the seed material(s) or to grow one or more species from one or more interfaces between the source material and seed material and/or seed material precursor. The phrase "source material precursor" in this context should be understood as meaning one or more materials which, under the process conditions of the invention, may form one or more source materials in situ. Further, it is possible that certain materials may function as (1) source materials and/or source material precursors and (2) be a supplier of an additional material which benefits the processing and/or the properties of the final body (e.g., certain materials like, for example, glassy carbon, may provide both a source material, such as carbon, and a desirable localized atmosphere, such as hydrogen). The phrase "seed material" in this context should be understood as meaning one or more material(s) which is/are capable, under the process conditions of the invention, of providing one or more crystalline structures onto which or from which the source material(s) is/are capable of being deposited or growing one or more desirable species therefrom. The phrase "seed material precursor" in this context should be understood as meaning one or more materials which, under the process conditions of the invention, may form one or more seed materials in situ. In addition, it should be understood that certain materials may function both as seed materials and seed material precursors under certain processing conditions. Further, it is possible that certain materials may function as (1) seed materials and/or seed material precursors and (2) a supplier of an additional material which benefits processing and/or properties of the final body. Additionally, it is possible that certain materials may function as (1) seed materials and/or seed material precursors and (2) a supplier of a material which forms at least a localized atmosphere which benefits processing and/or properties of the final body (e.g., certain metal hydrides may donate both (1) seed materials and/or seed material precursors and (2) hydrogen). It should be further understood that one or more source material(s) and/or one or more source material precursors and/or one or more seed material(s) and/or seed material precursor(s) may be used in combination with each other to influence favorably the processing of the final body and/or resultant properties of the final body.

The mixture of source material(s) and seed material(s) and/or precursors thereof may be homogeneous or non-homogeneous, depending on a number of different factors. For example, in some embodiments of the invention, an intimate or substantially homogeneous mixture may be desirable. A homogeneous starting material mixture may result in lower processing temperatures and/or shorter processing times and/or more homogeneous final bodies. Accordingly, the nanocomposite formation technique for making mixtures, as discussed above herein, may be ideally suited for numerous applications of the invention. However, it has also been shown that much less sophisticated methods of mixing are also acceptable. Additionally, non-homogeneous mixtures may be desirable for certain applications where, for example, graded final bodies are desirable and/or certain processing modifications are required. In this regard, non-homogeneous mixtures could be utilized to grade the composition of a body and/or the microstructure of a body. Examples of applications where a non-homogeneous mixture could be useful include filtration applications, catalysis applications, biomaterials, etc.

The relative particle size of the source material (or precursors thereof) compared to the seed material (or precursors thereof) may range from being approximately the same average particle size to either of the source material (or precursors thereof) or the seed material (or precursors thereof) having an average particle size which is tens to thousands of times larger than the average particle size of the other material. In general, the source material should be capable of interacting with the seed material in a manner which efficiently and economically results in the production of desirable materials. Accordingly, it should be apparent to an artisan of ordinary skill that a limitless combination of source materials (and/or precursors thereof) and seed materials (and/or precursors thereof) is possible depending on the desired processing characteristics of the materials and the desired properties of the final body to be produced.

The ability of the starting material mixture to hold its shape, whether the starting material mixture is applied as a coating on a substrate or forms a self-supporting body, may be important for certain applications. For example, the ability to form net or near-net shapes from a starting material mixture may be critically important. In such instances, a binder may be necessary to cause the starting material mixture to be capable of being shaped and holding its shape during at least part of the processing thereof. It is possible that both organic and inorganic binders may be suitable for use with the present invention. However, typically, when an organic binder is utilized, the amount of binder included in the starting material mixture should be minimized, so as to ameliorate any undesirable aspects which may result due to the presence of the binder (e.g., binder removal, etc.).

Techniques utilized to place starting materials for coatings on substrate materials and techniques utilized to form self-supporting starting material compositions include many traditional forming techniques such as spraying, dry pressing, extrusion, tape casting, soaking or immersion, hot and cold isostatic pressing, vacuum impregnation, etc. For example, it may be desirable for a starting material mixture to be applied onto or into a porous body such as a woven cloth or fibers or any other porous body where it could be considered to be desirable to form a coating (e.g., a diamond coating) on at least a portion of a wall which defines at least some of the porosity of the porous body. Thus, for example, a diamond coating could be placed onto at least a portion of any porous material where such diamond coating could provide enhanced performance (e.g., filtration devices, extrusion dies, biomedical materials, etc.).

It is also possible to form a sol-gel of appropriate starting materials. In such case, fibers could be drawn or pulled from the sol-gel mixture and thereafter processed according to the present invention. Further, carbon fibers, which may function as a source material, could be suitably coated with, for example, a seed material and processed accordingly to the present invention. Accordingly, the production of diamond fibers could be achieved by practicing certain techniques of the present invention. Moreover, appropriate starting materials could be impregnated with a polymer (e.g., a thermosetting polymer) which could thereafter be shaped by any conventional technique and then processed according to the present invention to form a desirable product. Additionally, a polymer could itself be shaped into a desired shape and then processed according to the present invention. When it is desired to utilize a polymer in combination with some other appropriate starting materials, the ratio of starting material mixture to polymer can be controlled to assure both the formability of the polymer/starting material mixture as well as the properties of the final product.

Once an appropriate starting material mixture has been formed, which includes at least one source material (or precursors thereof) and at least one seed material (or precursors thereof), the mixture is processed in accordance with the invention. Specifically, typically, the starting material mixture is heated to a suitable temperature in a suitable environment to permit formation or growth of one or more desirable species onto or from one or more seed materials. Numerous apparatuses are suitable for use in connection with the practice of the present invention. For example, those apparatuses which are capable of maintaining a controlled atmosphere (e.g., an atmosphere which does not adversely affect the formation of desirable bodies or an atmosphere which favorably influences the formation of desirable bodies) and which can achieve temperatures which permit the source material to deposit on and/or grow from, the seed material, are acceptable. Such apparatuses include, but are not limited to, chemical vapor deposition apparatuses which may or may not be assisted by microwave generator apparatuses, radio frequency generator apparatuses, filament heating apparatuses, etc. Common to each of these apparatuses is the capability to heat a material within at least a portion of the apparatus to a relatively high temperature (e.g., 300° C.–2000° C., more preferably 300° C.–1600° C. and even more preferably 700° C.–1000° C.) while maintaining a controlled atmosphere. In the present invention, the control of temperature and time are important for controlling the particle size and/or morphology of any crystalline species that are produced. In general, larger crystals can be achieved with higher temperatures and/or longer times, while relatively smaller crystals can be achieved with lower temperatures and/or shorter times. Moreover, by supplying certain favorable atmospheres (e.g., in the case of diamond formation atmospheres of, for example, hydrogen, nitrogen, carbon, oxygen, argon, etc., and mixtures thereof) to an appropriate starting material mixture, such atmosphere(s) may also influence favorably the particle size and/or morphology of any crystalline species that are produced. In general, the presence of a favorable atmosphere may increase particle size and/or result in a more dense structure in the final body. In addition, the atmosphere may be static or dynamic (i.e., flowing). In certain cases a dynamic atmosphere may favorably influence the properties of a final body which is formed according to the present invention. It should be understood by an artisan of ordinary skill that the precise combination of processing conditions for practicing the invention are dependent on the desired characteristics of the resulting bodies.

In certain aspects of the invention the apparatuses discussed above may be used to assist in the formation of a plasma which also may interact favorably with the starting material mixture. The formation of a plasma adjacent to at least a portion of the starting material mixture may facilitate or influence the formation of desirable materials or bodies from the starting material mixture. Without intending to be bound by any particular theory or explanation, it is possible that formation of a particular plasma, which is induced to contact at least a portion of a starting material mixture, may favorably impact or facilitate the movement of the source material to contact the seed material. For example, one or more species in a formed plasma may assist in transporting one or more species of a source material to at least a portion of a seed material. If such transport occurs, deposition or growth of a desirable material from or on the seed material may occur.

A plasma can be formed by conventional techniques which include inputting a vapor-phase material or combination of material into a controlled atmosphere apparatus and exciting such material(s) by, for example, microwave, radiowaves, resistance heating, etc., to form one or more gaseous species. Additionally, a plasma can be formed by exciting one or more source materials (or source material precursors) or by adding one or more precursor plasma materials to a source material such that when the precursor plasma material is excited by any of the means discussed above, a desirable plasma may form and be in contact with at least a portion of the starting material mixture. In some instances the formation of a plasma may be essential in order to achieve a desirable amount of deposition or growth on or from the seed material(s), whereas in other cases a plasma may not be required or may not perform an essential role in such deposition or growth.

To assist in understanding some important aspects of the invention, a comparison of the invention, when applied to diamond formation, against traditional chemical vapor deposition processes utilized for diamond formation may be useful.

In a traditional CVD process for diamond formation, the carbon source, always a gas (e.g., methane), is mixed with 95–99 percent hydrogen and the hydrogen is excited, for example, thermally or by a microwave field. In general, excitation of the carbon source gas results in the production of a complex mixture of various hydrocarbon species, plus some atomic hydrogen and molecular hydrogen. The produced carbon atoms can then agglomerate as very small nuclei on selected substrate materials. These agglomerated nuclei contain both $sp^2$ (i.e., graphitic structure) and $sp^3$ (i.e., diamond structure) bonding. Once at least some of the aforementioned nuclei have been deposited, atomic hydrogen, which is produced from the excitation of $H_2$, tends to dissolve or react away all of the $sp^2$ nuclei leaving predominantly $sp^3$ nuclei which form the diamond structure. The diamond nuclei may then grow into separate diamond crystals and eventually form a continuous film.

In contrast, with regard to traditional CVD diamond formation, the present invention does not rely on the use of a carbon-supplying starting vapor to produce diamond coatings and self-supporting diamond bodies. Rather, the present invention utilizes a non-vapor (e.g., solid or liquid) carbonaceous starting material. Specifically, in one preferred embodiment of the invention, a diamond seed material is provided (e.g., mixed with or inherently present as a portion of a carbon source material) along with a non-vapor phase carbon source material. The seed material and source material may be homogeneously or non-homogeneously mixed together. A supply of hydrogen (e.g., hydrogen gas or, atomic hydrogen either externally supplied or created in situ from one or more materials in the seed material (or seed material precursors) or the source materials (or source material precursors) may be supplied to the mixture of carbon source material and diamond seed material. The mixture and supply of hydrogen are exposed to a high temperature (e.g., 300° C.–1600° C.) which permits a majority of $sp^2$ graphitic carbon to be converted to the $sp^3$ diamond structure. Additionally, carbon from the carbonaceous starting material is permitted to interact with the $sp^3$ diamond seeds and results in the growth of diamond from or on the seed crystals.

An artisan of ordinary skill should understand that a majority of the carbon which forms the final desired diamond product, is supplied by the carbon source material adjacent the diamond seeds. By supplying carbon in this manner, diamond films and self-supporting diamond bodies previously believed to be difficult, if not impossible to achieve, can be readily formed. In addition, the process of the invention can be particularly attractive when a carbon source material is placed in the immediate vicinity (e.g., from several nanometers to several microns) of the diamond seed crystals. While not wishing to be bound by any particular theory or explanation, it appears possible that the carbon source material may transform to diamond by a vapor phase, or catalytic molten intermediary or even a solid state transformation process, which is made possible, in part, by the presence of the very fine diamond seed crystals which provide for epitaxial nuclei for the growth of the larger diamond crystals. Moreover, it is also plausible that the juxtaposition and concentration of the carbon source material relative to the diamond seed crystal enhances the interaction between the materials by, for example, increasing the amount of possible reactions between the carbon source and the diamond seeds.

In a fourth aspect of the present invention regarding the formation of diamond, additional gases utilized in traditional CVD processes may, optionally, be added. For example, hydrocarbon gasses such as methane may be inputted to the source material/seed material mixture to cause even further growth of diamond crystals onto or even between those crystals produce by, for example, the above-discussed reactions. Accordingly, the amount of hydrocarbon gas provided can be controlled in a manner which permits even further control of the microstructure of a formed body.

With respect to diamond formation according to the present invention, non-vapor phase carbon source materials appear to include virtually any form of carbon. However, those forms which are particularly preferred include finely dispersed carbon ($1<\mu m$), commercially available AQUA-DAG® colloidal graphite, carbon black, glassy carbon, soot, lamp black, organic polymers which are capable of being converted to carbon in situ, etc. Certain carbon source materials may contain one or more additional materials which favorably influence(s) the resultant diamond product. For example, if a carbon source material was doped with nitrogen and/or phosphorus (e.g., C—N and/or C—P bonds were formed in the carbon source material) desirable doping of the resultant diamond product could be expected to occur (e.g.,such products could be used for electronic applications such as P/N junctions). Moreover, it is possible to form large single crystal diamonds by, for example, coating multiple layers of very fine mixtures comprising carbon onto a surface of a seed and causing said multiple layers to sequentially or substantially simultaneously convert to diamond.

Acceptable diamond seed materials include diamond powder but any seeds of diamond or diamond-like structures (e.g., cBN, silicon, silicon carbide, various face-centered cubic crystalline structures which are similar to the crystal lattice of diamond, or other isostructual materials, etc.), could also function as appropriate seed materials. In addition, certain materials may also function as seed material precursor(s). Such materials may be used alone or in addition to seed materials and/or other seed material precursor material(s). It is possible that under certain processing conditions a seed material precursor may also function as a seed material. Certain important considerations in selecting seed material(s) and/or seed material precursor(s) include the chemistry of the material(s) (e.g., the ability of the material(s) to catalyze the formation of diamond) the stability of the material(s) (e.g., to withstand certain aspects of the processing conditions of the invention), the structure and lattice constant of the material(s) (e.g., to approximate those of diamond), etc. Acceptable seed materials and/or seed material precursors in addition to those discussed above include, for example, Ni, Si, Cu, Fe, Mo, Pt, Pd, etc. Moreover, certain materials may perform multiple roles during the process of the present invention. Specifically certain materials may function as (1) a seed material and/or seed material precursor and (2) a source of hydrogen. In this regard, simple or complex metal hydrides (e.g., lanthanum hydrides, tantalum hydrides, lanthanum-nickel hydrides, zirconium hydrides, titanium hydrides, etc.) may supply hydrogen, which is useful in the production of diamond, in addition to seed materials and/or seed material precursors (e.g., one or more of lanthanum or nickel or compounds thereof).

The selection of any particular metal hydride is dependent upon a number of factors including the processing temperature at which the metal hydride disassociates into its component parts. In a preferred embodiment of the invention, the metal hydride disassociates at a temperature which is at or near the processing temperature of the invention. In this instance, hydrogen from the disassociated metal hydride is available to interact favorably with the carbon source material. If the metal hydride disassociated at too high or too low of a temperature, the hydrogen may not be able to influence favorably the processing and/or properties of the final body.

Further, in certain aspects of the invention, it may be determined that an atmosphere of hydrogen, whether local or global (i.e., throughout the contents of a reaction vessel) may be desirable, In certain cases, a metal hydride material may be capable of supplying a sufficient amount of hydrogen (e.g., at least a local atmosphere) to achieve desirable reactions. However, in other cases, the metal hydride material may supply hydrogen in addition to an external supply source of hydrogen.

In another preferred embodiment, boron nitride (e.g., cubic boron nitride) can be made in a manner similar to the methods of the present invention discussed above and which were utilized to form diamond.

With respect to the growth of cubic BN from solid state sources, the prediction that a BN usually prepared in the graphitic structure could be made into the diamond structure should be clear to anyone familiar with the science of crystal chemistry. Van Arkel was the first to explicitly refer to this in 1926. In addition, a research team at General Electric successfully converted hexagonal BN to cubic BN in 1955 at elevated pressures (>50 kb) and temperatures (>1000° C.). However, as discussed above, such traditional technique suffers from many disadvantages.

The following examples are offered to illustrate particular embodiments of the invention, but are not intended to limit the invention claimed in the appended claims.

EXAMPLE 1

This Example demonstrates a first method for forming diamond according to the present invention by utilizing a microwave plasma assisted CVD reactor.

A starting source of carbon, as discussed in the detailed description, was prepared by placing a sample of AQUA-DAG® E colloidal graphite (Acheson Product Code No. 5300021, purchased from Ted Pella, Inc., Tustin, Calif.) into a small glass beaker. The AQUA-DAG® E was diluted with an amount of deionized water having a resistivity of greater than about 7 M ohms, so that the ratio of AQUA-DAG® E to water was about 1:3. The AQUA-DAG® E/deionized water mixture was stirred by hand for about 10 minutes utilizing a stainless steel spatula which had previously been thoroughly degreased with acetone in an ultrasonic bath, washed in deionized water in an ultrasonic bath, and dried.

The seed material, as discussed in the detailed description, was prepared by first cleaning a 3 ml glass bottle by degreasing the bottle with acetone in an ultrasonic bath and then washing the bottle with deionized water in the ultrasonic bath. This procedure was repeated several times and, finally, the bottle was hot air dried (utilizing a commercially available hair dryer) after a final methanol rinse.

The cleaned 3 ml glass bottle was placed onto a microbalance and a sample of diamond powder (supplied by South Bay Technology) weighing about 0.075 grams and having an average particle size of about 3–6 microns was placed into the glass bottle. About 0.525 grams of deionized water was then placed into the glass bottle and mixed with the diamond powder by utilizing a fine, cleaned wire and hand-stirring the diamond powder and water together.

A silicon substrate measuring about 1 cm×1 cm and having a thickness of about 0.2 mm was cut from a larger silicon wafer utilizing a diamond scriber. The silicon substrate was cleaned in the following manner. About 25 ml of high purity acetone was placed into a clean 50 ml Pyrex® glass beaker. Utilizing a clean, fine tweezer, the silicon substrate was placed into the beaker and submerged in the acetone. The beaker, containing the acetone and the silicon substrate, was placed into the fluid containing vessel of an ultrasonic cleaner. The fluid in the ultrasonic cleaner was water and care was taken to assure that the water level in the fluid containing vessel was maintained below the top of the beaker. The silicon substrate was then subjected to four acetone ultrasonic baths, changing the acetone after each bath. Each ultrasonic bath lasted about 3 minutes. After four acetone ultrasonic baths, the beaker was removed from the ultrasonic cleaner and the acetone was removed from the beaker. Then, about 25 ml of deionized water having a resistivity greater than about 7 megaohms was placed into the beaker and the silicon substrate was subjected to four separate ultrasonic baths utilizing deionized water as the bath, with the deionized water being changed after each ultrasonic bath. Each ultrasonic bath lasted about 3 minutes.

After the fourth deionized water ultrasonic bath, the beaker was removed from the ultrasonic cleaner and the deionized water was removed from the beaker. About 2 ml of high purity methyl alcohol was then poured into the beaker and the silicon substrate was subjected to the ultrasonic bath for about 1 minute. After about 1 minute, the beaker was removed from the ultrasonic cleaner and the methyl alcohol was removed from the beaker. The silicon substrate was then removed from the beaker and dried with a warm air blower (i.e., a commercially available hair-dryer set on "low").

The silicon substrate, now cleaned and dried, was placed into a small petri dish and utilizing a microbalance, a silicon substrate weight of about 0.0735 grams was recorded.

The AQUA-DAG® E/deionized water mixture was thoroughly remixed and utilizing a fine, cleaned spatula, a droplet (weighing about 0.0017 grams) of the AQUA-DAG® E/deionized water mixture was applied to about the center of one of the 1 cm×1 cm sides of the silicon substrate.

The diamond powder/deionized water mixture was thoroughly remixed and utilizing a cleaned 1 mm diameter wire, a very small droplet (weighing about 0.0118 grams) of the diamond powder/deionized water mixture was also placed approximately in the center of the same 1 cm×1 cm side of the silicon substrate so that both of the mixtures could be mixed together. To facilitate proper mixing and even spreading of the AQUA-DAG® E/deionized water mixture and the diamond powder/deionized water mixture together, one drop of deionized water was also applied approximately to the center of the same 1 cm×1 cm side of the silicon substrate. Then, by utilizing the rounded tip of the spatula, the AQUA-DAG® E/deionized water mixture, the diamond powder/deionized water mixture and the deionized water drop were thoroughly mixed by hand for about 4 minutes and then slowly and evenly spread on to the surface of the silicon substrate, such that substantially all of the 1 cm×1 cm surface of the silicon substrate was substantially evenly coated with the mixture.

The petri dish holding the coated silicon substrate was then placed onto a horizontal surface in a room temperature, air atmosphere, dust-free cabinet and left to dry for about 3 hours. After about 3 hours, a temperature of about 80° C. was established within an air atmosphere, ambient pressure oven and the petri dish containing the coated silicon substrate was removed from the dust-free cabinet and placed into the oven. After about 5 minutes, the petri dish and the coated silicon substrate were removed from the 80° C. oven and placed into an air atmosphere, ambient pressure oven having a temperature of about 150° C. After about 5 minutes, the petri dish and the coated silicon substrate were removed from the oven and the coated silicon substrate was placed onto a microbalance and a weight of about 0.0784 grams was recorded.

Figure 9:
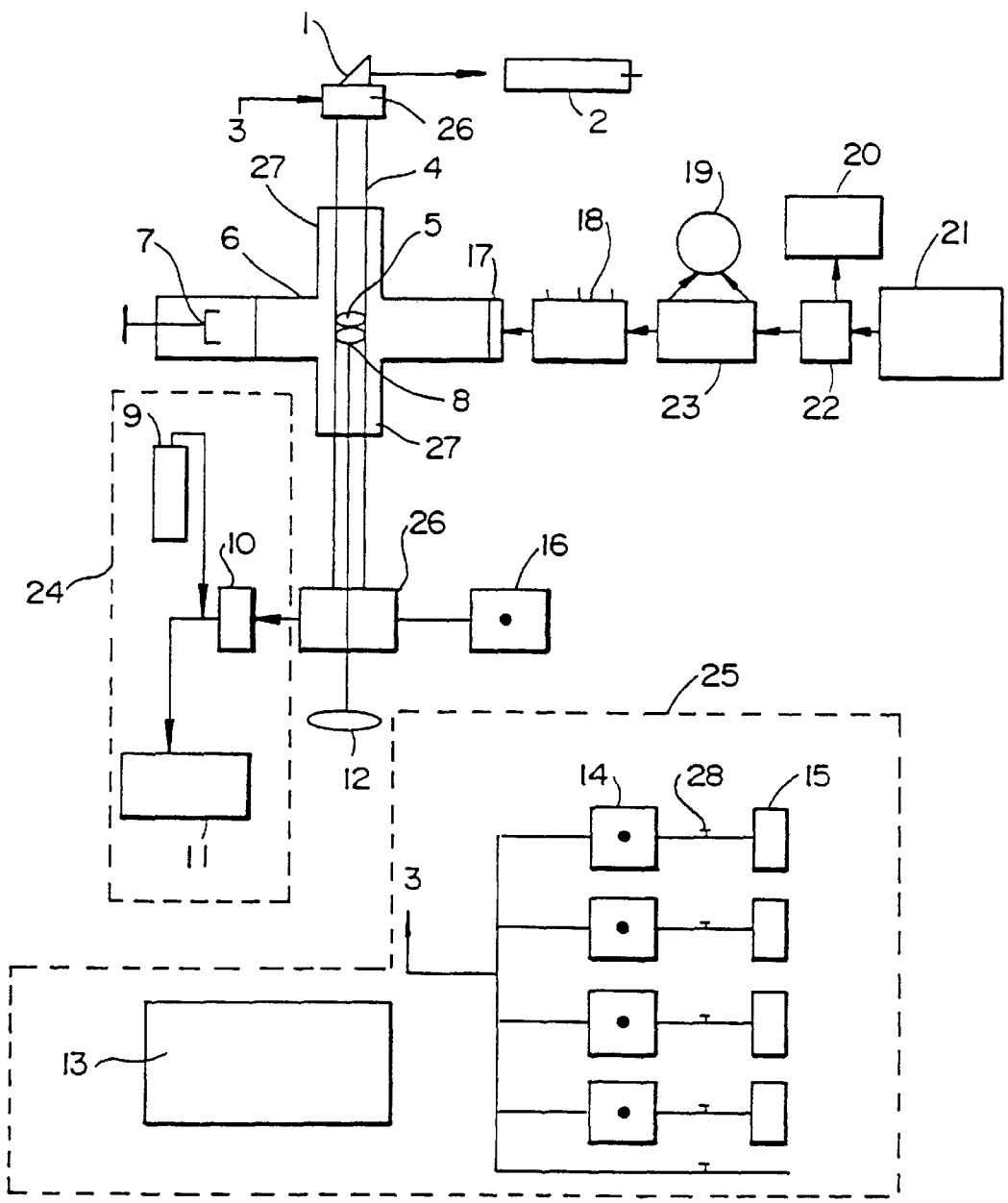
FIG. 9 is a schematic view of the microwave plasma assisted chemical vapor deposition reactor which was utilized in Examples 1, 2, 3 and 6.

FIG. 9 is a schematic view of a microwave plasma assisted chemical vapor deposition reactor (MPCVD) which was utilized in this Example. Table I provides in tabular form a list of the different components of the MPCVD shown in FIG. 9, wherein the reference numerals utilized in FIG. 9 are cross referenced to the different components of the MPCVD system.

TABLE I

| Reference Numerals | Component Parts |
|---|---|
| 1 | quartz window |
| 2 | optical pyrometer |
| 3 | gas inlet tube |
| 4 | quartz tube |
| 5 | plasma |
| 6 | microwave cavity |
| 7 | tuning short |
| 8 | substrate holder |
| 9 | nitrogen cylinder |
| 10 | exhaust valve |
| 11 | vacuum pump |
| 12 | substrate adjust |
| 13 | electronic control circuits |
| 14 | mass flow controllers |
| 15 | gas cylinders |
| 16 | pressure transducer |
| 17 | iris |
| 18 | microwave stub-tuner |
| 19 | F/R power meter |
| 20 | dummy load |
| 21 | microwave power-generator |
| 22 | circulator |
| 23 | directional coupler |
| 24 | exhaust system |
| 25 | gas flow inlet control system |
| 26 | metallic multi-port adapters |
| 27 | beyond cut-off tubes |
| 28 | high vacuum stoppers |

As shown in FIG. 9, the MPCVD system consists of a quartz tube 4 passing through the maximum field intensity region of a microwave cavity 6. The tube 4 is provided with vacuum type metallic multi-port adapters 26 at both ends. The ports are connected to a gas flow (inlet) control system 25 consisting of gas cylinders 15, mass flow controllers 14, electronic control circuits 13, high-vacuum stoppers 28, and gas inlet tube 3, on the upper end and an exhaust system 24 consisting of an exhaust valve 10, a nitrogen cylinder 9, and a vacuum pump 11, at the lower end. A quartz window 1 is provided at the top of the quartz tube 4 for viewing as well as measuring the substrate temperature with an optical pyrometer 2. Water cooling jackets (not shown) are provided around the quartz tube 4 and the resident microwave cavity 6. The silicon substrate is positioned on the graphite substrate holder 8 (having a diameter of about 18 mm and having a projecting rim of about 0.5 mm, machined from a quantity of high-grade graphite), supported by a quartz/stainles steel rod, and is inserted into the reactor from the vacuum type port at the bottom of the quartz tube 4. Use of special O-rings at the joints (inside the metallic multi-port adapters 26) make it possible to position the substrate and rotate it, by utilizing the substrate adjust 12, if required for centering inside the cavity 6.

A suitable microwave-stub-tuner 18 and wave guide variable tuning short 7 are provided for matching the impedance of the cavity 6 to the microwave power source and for tuning the cavity 6 to the microwave power source frequency, respectively. The use of beyond cut-off tubes 27 on both sides of the cavity 6 avoid leakage of microwave power form the reactor.

Mass flow controllers 14 (MKS Instruments, Inc., Andover, Mass.), along with the electronic control circuits 13, are used to adjust the flow of the gas through the gas inlet tube 3 and through the reactor. The pressure inside the reactor is substantially maintained at a predetermined set value by an electromechanically operated exhaust valve 10 fitted between the reactor and the exhaust pump 11.

The coated silicon substrate was placed into the substrate holder 8 with the coated side facing up. A gas flow rate of about 90 sccm of ultrahigh purity hydrogen and about 10 sccm of a mixture of 10% methane, balance utrahigh purity hydrogen (i.e., a total gas flow rate of about 100 sccm) was established through the gas inlet tube 3 and through the reactor. A reactor pressure of about 90 torr was established. The microwave power from the microwave power generator 21 was turned on, thus producing a plasma 5 and the temperature of the coated silicon substrate was raised from about room temperature to about 990° C. in about 20 minutes. The gas flow rate, reactor pressure and temperature were maintained for about 6 hours. After about 6 hours, the microwave power was gradually reduced in about 10 minutes and then turned off; the substrate temperature was allowed to cool to about room temperature; the pressure within the reactor was increased to ambient; and the gas flow rate was interrupted completely. The substrate was then removed from the substrate holder 8 and the coated side of the substrate was analyzed utilizing a microfocus Raman Spectrograph (Model ISA RAM U-1000). The control setting of the Raman Spectrograph were set as follows: laser wave length=514.532 nm; laser power=150 mw; slits=200 um; increment=1.00 $cm^{-1}$; magnification=40 X; and NB scans=1.

Figure 2:
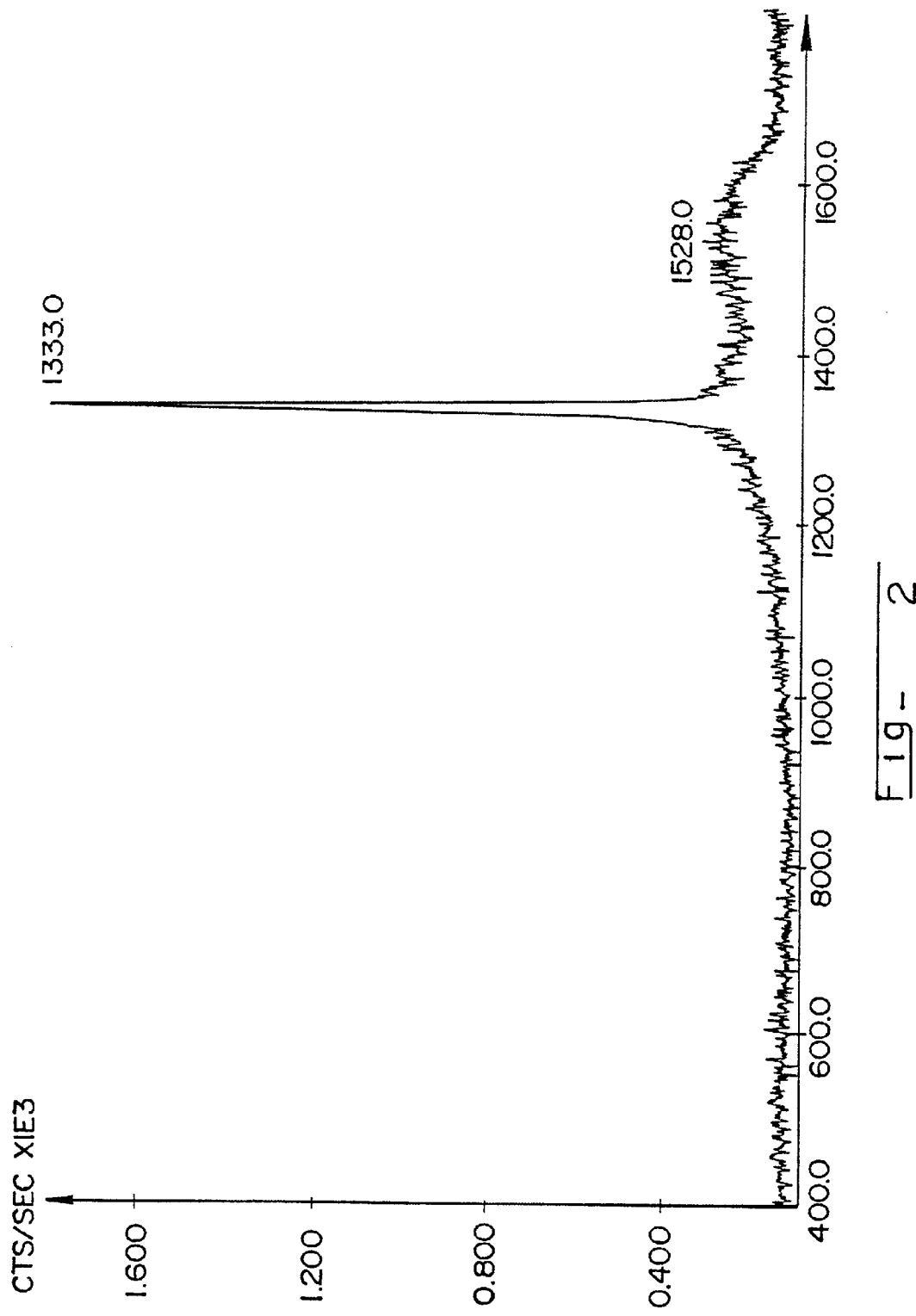
FIG. 2 is a Raman Spectrum of a material formed in accordance with the present invention as set forth in Example 1.

The coated side of the substrate was subjected to Raman spectroscopy and, as shown in FIG. 2, a very sharp Raman line around 1332 $cm^{-1}$ was obtained from the coating on the sample. This value corresponds to diamond crystals only. The spectrum also showed that graphitic carbon was practically absent from the scan.

Figure 3:
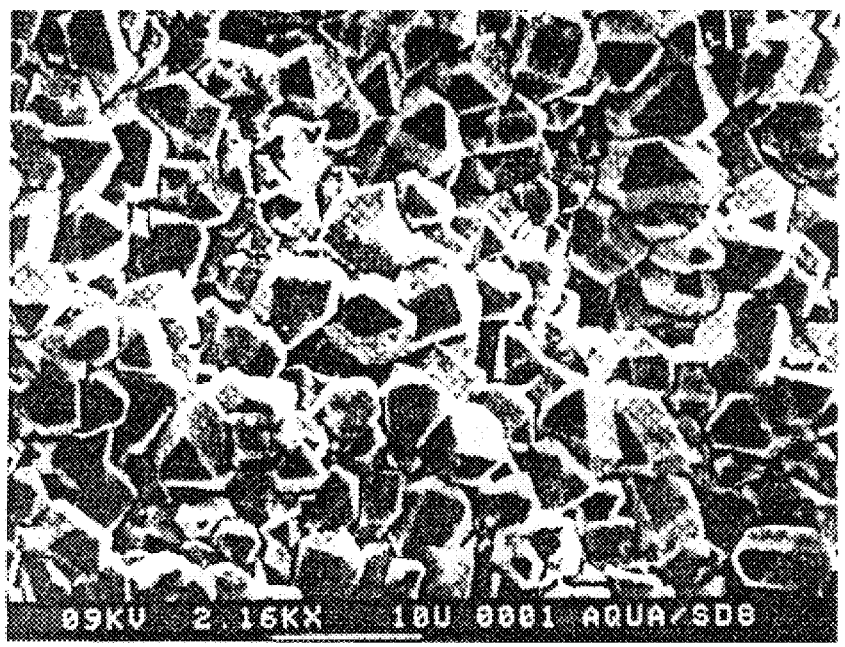
FIG. 3 is an SEM photomicrograph taken at about 2150X of the material of the present invention formed in accordance with Example 1.

Also, scanning electron microscopy pictures were taken from the coated surface of the silicon substrate and, as shown in FIG. 3, showed the polycrystalline morphology of the diamond coating, its pure crystalline structure and good nucleation density. An environmental type SEM (Electroscan ES-30) and a high vacuum type SEM (ISI DS 130) were used for this purpose.

Finally, the coating was analyzed using x-ray diffraction and an x-ray diffraction spectrum showed a peak at d=0.2056nm (2.056 Angstrom), which corresponds to diamond crystals, thus, further confirming the quality of the diamond layer formed on the substrate.

EXAMPLE 2

Figure 4:
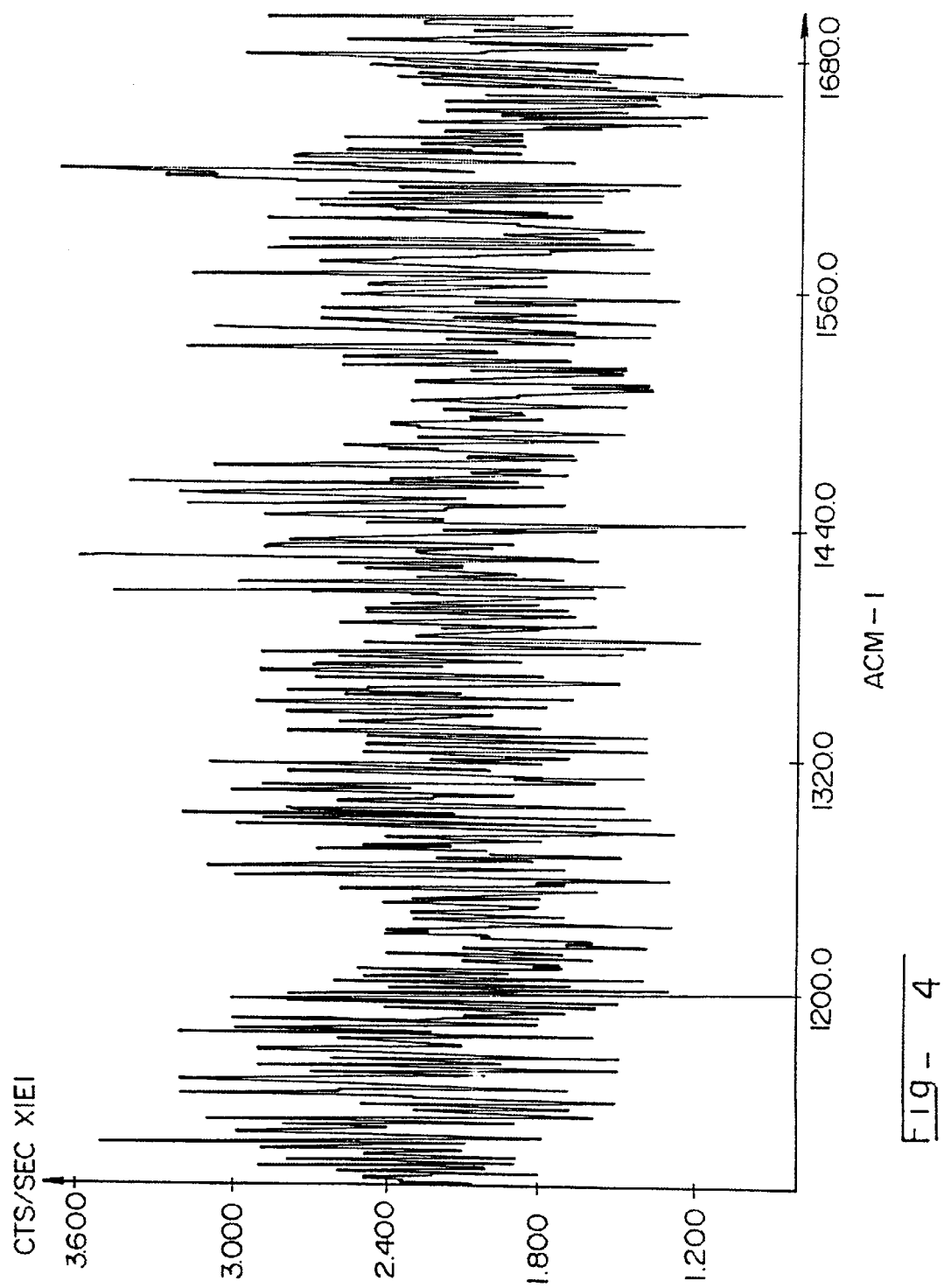
FIG. 4 is a Raman Spectrum of a comparative example material formed in accordance with Example 2.
Figure 5:
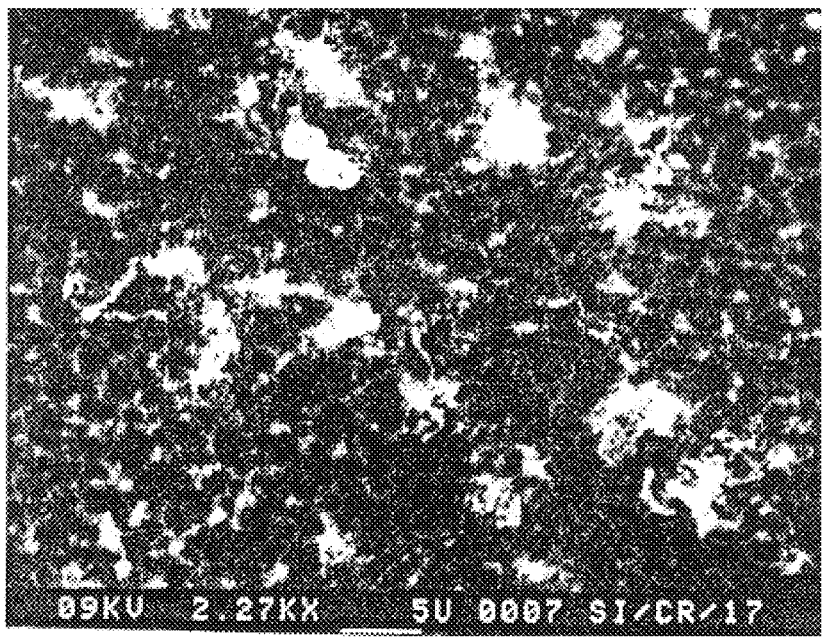
FIG. 5 is an SEM photomicrograph taken at about 2270X of the comparative example material formed in accordance with Example 2.

The procedures of Example 1 were repeated exactly except that no external isostructural seed material, (i.e. fine diamond powder) was put in the coating. In the comparative example the starting material mixture of AQUA-DAG® E colloidal graphite, shown in FIG. 1, did not show any change under the process conditions. In this regard, there was no diamond formation in the Raman spectrum as shown in FIG. 4, or evidenced by the SEM photomicrograph, as shown in FIG. 5.

EXAMPLE 3

The following samples demonstrate further processing modifications of the method of forming diamond set forth in Example 1.

Sample A

Aqua-Dag® E colloidal graphite, a product of Acheson Colloids Company, Port Huron, Mich., Product Code 5300021, was used as the starting source of carbon. About five grams of the Aqua-Dag® E was placed into a 30 ml Pyrex® glass beaker which had been cleaned along with a stainless steel spatula using several flushes of acetone, deionized water, a final rinse in methanol, and drying. Ultrasonic agitation for about 5 minutes was used at each state of the cleaning process in an ultrasonic bath (manufactured by Geoscience Instruments Corporation, New York).

While stirring the Aqua-Dag E® with the stainless steel spatula, about 15 ml of deionized water, of resistivity better than 7 M ohms, was added to the Pyrex® beaker. A watch glass, cleaned and dried in essentially the same manner as the Pyrex® beaker mentioned above, was used to weigh about 0.250 gram of diamond seed powder, about 2 micron size, (supplied by Warren Diamond Powder Company, Inc.). This diamond powder was mixed with the Aqua-Dag E® sol and ultrasonicated for about 15 minutes to make a homogeneous diphasic sol of Aqua-Dag E® and diamond seeds.

A silicon substrate measuring about 1 cm×1 cm and having a thickness of about 0.2 mm was cut from a larger silicon wafer using a diamond scriber. The substrate was thoroughly cleaned and dried in essentially the same manner as described in Example 1 and thereafter placed in a clean petri dish. The petri dish holding the silicon wafer was kept on a horizontal surface and two drops of the freshly sonicated Aqua-Dag® E/diamond seed sol were placed in the middle of one 1 cm×1 cm side of the silicon substrate. Utilizing the stainless steel spatula and a see-saw tilting of the petri dish the sol was uniformly coated on one 1 cm×1 cm side of the silicon substrate. The coating was dried first at room temperature in a dust-free cabinet and then in an oven at 80° C., as described in Example 1.

The microwave plasma assisted chemical vapor deposition system (MPCVD) described in detail in Example #1 and shown in FIG. 9 was used in this example. The silicon substrate covered with the dried sol was placed on a substrate holder 8 mounted on the quartz/stainless steel rod 12 which is inserted into the quartz tube reactor at its bottom. The multiport metallic adaptor 26 was properly clamped for a vacuum tight seal. Initially the substrate holder 8 was kept about 1 cm below the level of the microwave cavity 6. The exhaust valve 10 was opened and a gas flow rate of about 90 sccm of ultrahigh purity hydrogen was established through the reactor. The pressure was adjusted and raised from about 0.1 torr to about 20 torr and the microwave power was switched on to produce a plasma in the reactor. The pressure was raised to about 90 torr and the substrate holder was gradually raised into the microwave cavity level, in about 10 minutes. The microwave power level from the generator 21, the tuner 18 and the tuning short 7 were simultaneously adjusted to confine uniformly the plasma to the substrate/substrate holder and to adjust the temperature of the substrate, as indicated by the optical pyrometer 2, to about 950° C. The reflected microwave power as indicated by the forward/reflected power meter 19 was reduced to a minimum value in the course of these finer adjustments. At this point a flow of gas comprising about 10% methane, balance ultrahigh purity hydrogen was switched on at a flow rate of about 10 sccm to achieve a net methane content of about 1% in hydrogen and a total gas flow rate of about 100 sccm. The stub-tuner 18, tuning short 7 and microwave power were further fine turned to achieve an indicated temperature of about 990° C. at the substrate. The gas pressure, gas flow rates and temperature of the substrate were maintained for about 6 hours.

The microwave power was then gradually reduced, in about 5 minutes, to zero and the system was allowed to cool to about room temperature. The methane supply was switched off. After about 20 minutes, air was introduced into the reactor and the substrate removed form the holder for optical microscopic examination, followed by SEM, XRD and Raman spectrum characterization, as detailed in Example 1.

Figure 23:
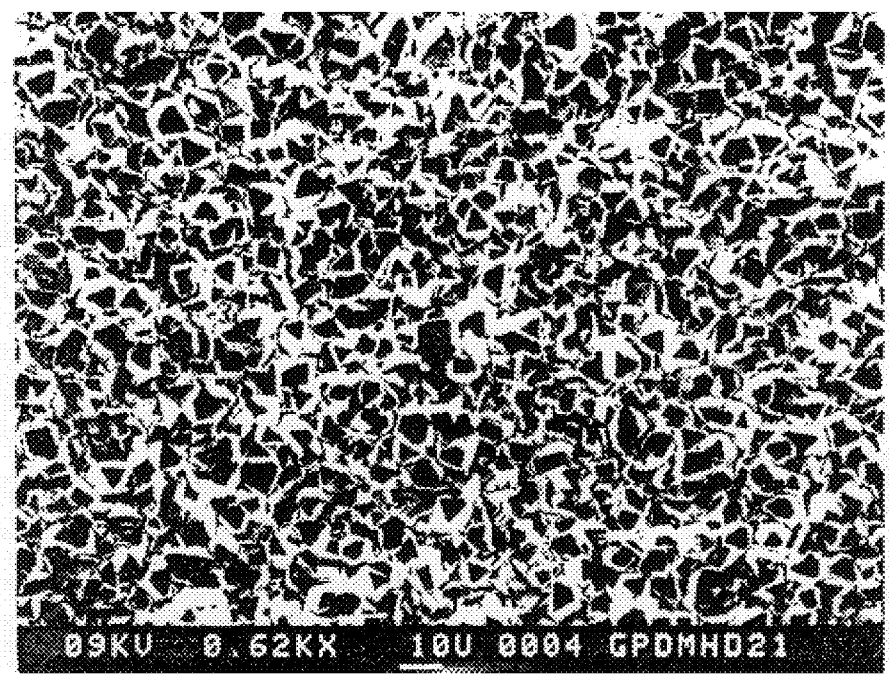
FIG. 23 is an SEM photomicrograph taken at about 620X of the material formed in accordance with Example 3, Sample A.
Figure 24:
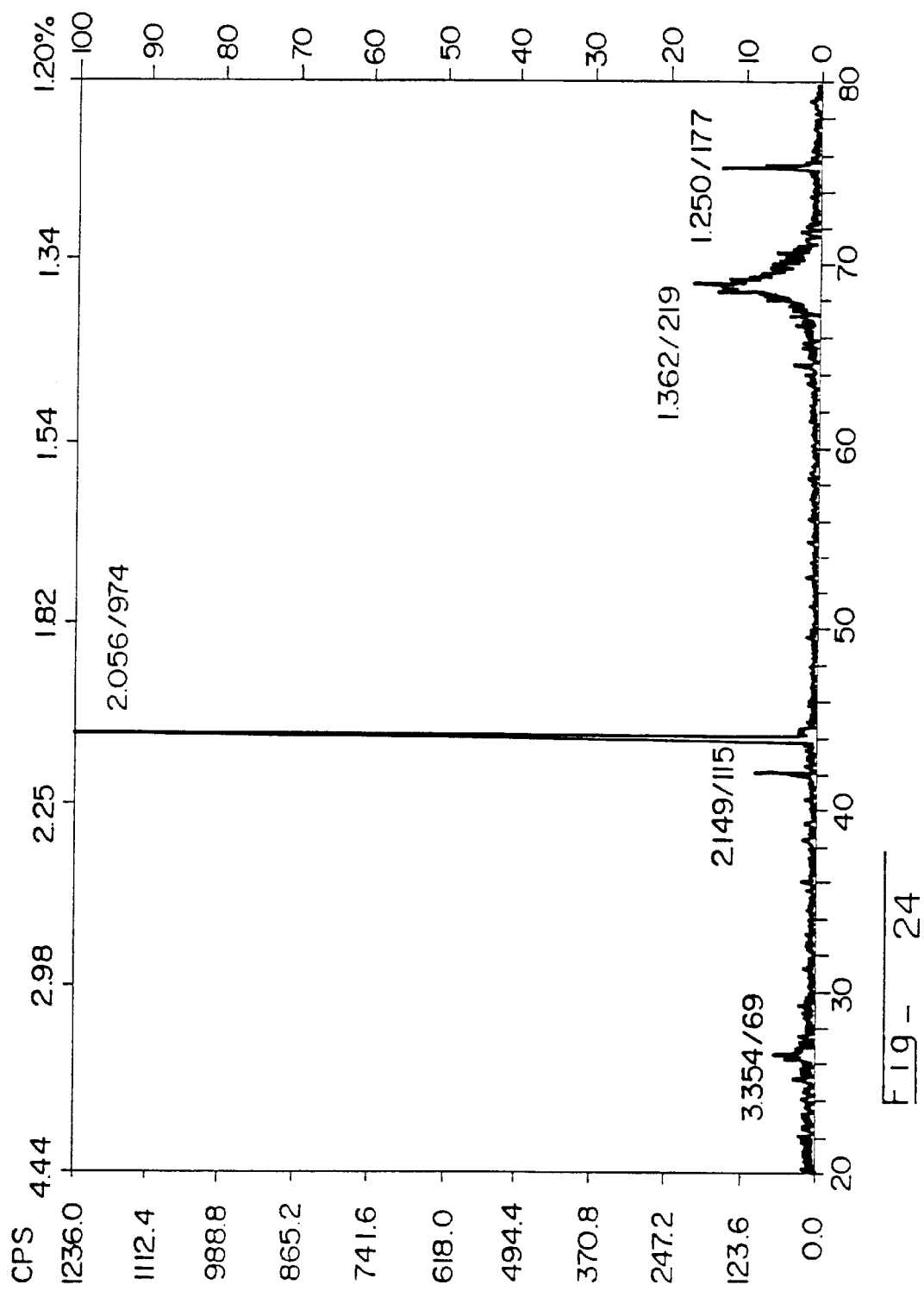
FIG. 24 is an x-ray powder diffraction pattern of the material formed in accordance with Example 3, Sample A.
Figure 25:
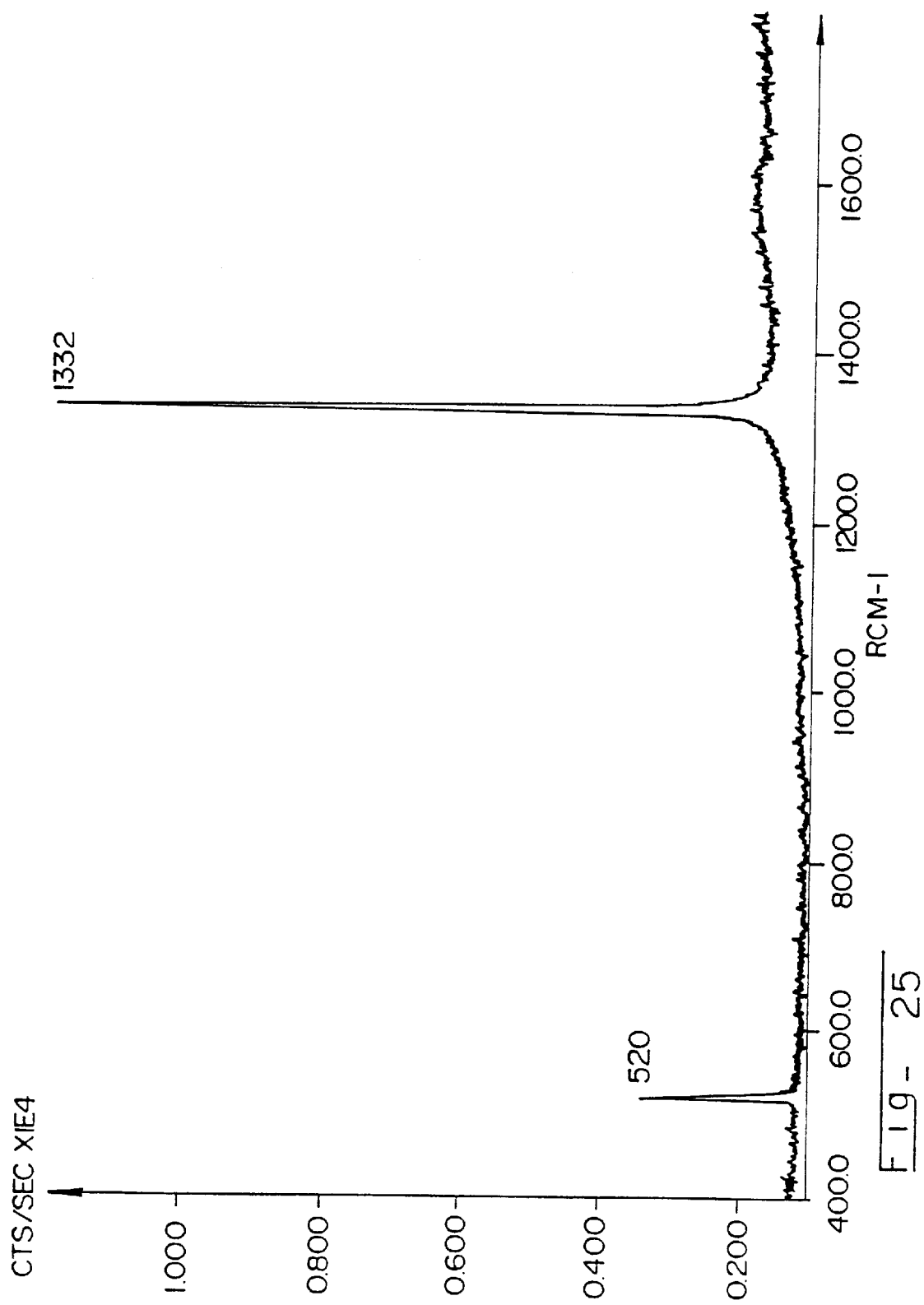
FIG. 25 is a Raman Spectrum of the material formed in accordance with Example 3, Sample A.

The SEM photographs, x-ray diffraction lines and Raman spectra all showed the presence of polycrystalline diamond on the silicon substrate. Specifically, FIG. 23 is an SEM photomicrograph taken at about 620 X of the material formed in this Sample. FIG. 24 is an x-ray powder diffraction pattern of the material formed in this Sample. FIG. 25 is a Raman Spectrum of the material formed in this Sample.

Sample B

The steps set forth in Sample A were repeated essentially except that no methane gas was introduced into the reactor. A total ultrahigh purity hydrogen gas flow rate of about 100 sccm was maintained throughout the reaction. SEM photographs, XRD diffraction lines and Raman spectra were obtained, as detailed in Example 1, to confirm the formation of polycrystalline diamond on the silicon substrate.

EXAMPLE 4

This Example demonstrates that many variations of the process parameters set forth in Example 3, Samples A and B, can be systemically varied and still lead to the formation of diamond in accordance with the present invention.

Table II sets forth the various materials and process conditions which have been varied and have produced diamond in accordance with the present invention.

TABLE II

| Source of solid carbon | Seed/Seed Precursor Material | Temperature Range | Gas Composition | Reaction Time Range |
|---|---|---|---|---|
| AQU-DAG ® E colloidal graphite | Silicon | 400° C.–1500° C. | Hydrogen | 4–24 hours |
| | cubic Boron Nitride | | Hydrogen and Methane | |
| Charcoal | | | $H_2O$ and $CR_3OH$ | |
| Carbon Black Polymer (phenol-formaldehyde resin) | Silicon carbide | | | |
| | Nickel | | | |
| Glassy Carbon | Copper | | | |
| Vulcan XC-72R carbon powder | Molybdenum | | | |
| | Zirconium | | | |
| | Palladium | | | |

Selected illustrative samples which follow illustrate some of the many possible changes in parameters.

Sample A

This example demonstrates a method of using a polymer, specifically, phenol-formaldehyde resin, as non-vapor starting material precursor source of solid carbon. First, the polymer was heated at about 500° C. for about 10 hours in a nitrogen atmosphere to form a glassy carbon precursor. About 0.5 g of the glassy carbon precursor was mixed with about 0.025 g of diamond seeds having an average particle size of about ≤1 µm (supplied by Johnson Matthey). A solution containing about 4 ml of deionized water and about 1 ml of ethanol was added to the glassy carbon precursor/diamond seeds mixture. This diphasic mixture was dispersed by ultrasonication for about 3 minutes. Several drops of the diphasic sol was spread on a 1 cm×1 cm side of a cleaned silicon substrate (prepared substantially as set forth in Example 1) having a thickness of about 0.2 mm to form a layer and dried at about 80° C. for several hours in an air atmosphere oven. Essentially the same process as used in Example 3, Sample B for processing was carried out. Excellent Raman and XRD data proved the formation of diamond.

Sample B

About 0.5 gram of a commercial glassy carbon source material (obtained from Tokai Carbon Co. Ltd., Japan, Grade GC-20) was mixed with about 0.025 g of diamond seeds having an average particle size of about $\leq 1$ $\mu$M (purchased from Johnson Matthey) using a pestle and mortar. The whole mixture was transferred to a clean glass tube. A mixture of solvents containing about 2 ml of deionized water, about 2 ml of ammonium hydroxide and about 1 ml of ethanol were added to the glassy carbon/diamond seed mixture. The mixture was then dispersed utilizing an ultrasonic bath for about 3 minutes. About two drops of the sol were placed on one side of a silicon substrate measuring about 1 cm×1 cm (prepared and cleaned essentially as described in Example 1) and spread evenly thereon (as described in Example 1) to form a layer, and the silicon substrate was dried at about 80° C. for about 2 hours in an air atmosphere oven. Essentially the same process described in Example 3, Sample B was used to form the diamond. Excellent Raman and XRD data were obtained, thus proving the conversion of diamond seeded glassy carbon into diamond.

Sample C

A carbon source material comprising an about 4 gram sample of Aqua-Dag® E colloidal graphite (Acheson Colloids Company) was placed into a 50 ml Nalgene® beaker (purchased from Fisher Scientific). About 0.05 gram of diamond seeds (Johnson Matthey) having an average particle size of abut $\leq 1$ $\mu$ were added to the Nalgene® beaker. About 10 ml of deionized water, having a resistivity of about 4 M ohms, was added to the Nalgene® beaker and the contents of the beaker were stirred utilizing a stainless steel spatula which had been thoroughly cleaned with deionized water and dried in an air atmosphere oven at about 100° C. The contents of the Nalgene® beaker were then subjected to ultrasonication for about three minutes in order to disperse the particles to produce a diphasic sol. Two drops of the solution were put on one side of a silicon substrate measuring about 1 cm×1 cm (prepared and cleaned essentially as described in Example 1) and spread evenly thereon (as described in Example 1) to form a layer, and the substrate was dried in an oven kept at about 80° C. for about 2 hours. The silicon substrate coated with the diphasic sol was placed into a graphite plate and into the reaction chamber of an Astex system microwave plasma assisted chemical vapor deposition reactor (purchased from Applied Science and Technology Inc., Woburn, Mass.). Essentially the same processing steps set forth in Example 9 were followed, except that the temperature of the graphite plate was maintained at about 400° C. and the process time was about 20 hours. Excellent Raman and XRD data proved the conversion to diamond.

Sample D

A carbon source material comprising about 4 grams of AQUA-DAG® E colloidal graphite (Acheson Colloids Company) was placed into a 50 ml Nalgene® beaker (purchased from Fisher Scientific). About 0.05 gram of diamond seeds (Johnson Matthey) having an average particle size of about $\leq 1\mu$ were added to the Nalgene® beaker. About 10 ml of deionized water, having a resistivity of about 4 M ohms, was added to the Nalgene® beaker and the contents of the beaker were stirred utilizing a stainless steel spatula which had been thoroughly cleaned with deionized water and dried in an air atmosphere oven at about 100° C. The contents of the Nalgene® beaker were then subjected to an ultrasonic bath for about three minutes in order to disperse the particles to produce a diphasic sol. The solution was dried overnight at about 80° C. in an air atmosphere oven. The diphasic dried gel powder was removed form the beaker and ground using a mortar and pestle. Then the powder was compacted into pellets measuring about 2 mm thick and 10 mm in diameter. One pellet was placed onto the graphite holder in the MPCVD system shown in FIG. 9. Essentially the same processing steps used in Example 3, Sample B were followed, except that the temperature of the sample was maintained at about 1500° C. for about 24 hrs and the pressure was maintained at about 250 torr. Excellent Raman and XRD data proved the conversion to diamond.

Sample E

Both processes described in Example 3, Samples A and B were repeated with the difference that instead of diamond powder as the seed material, very fine powder samples of nickel, copper, molybdenum, platinum and palladium were used as the seed material and/or seed material precursor. Good formation into diamond crystals was confirmed by SEM, Raman and XRD characterization.

Figure 28:
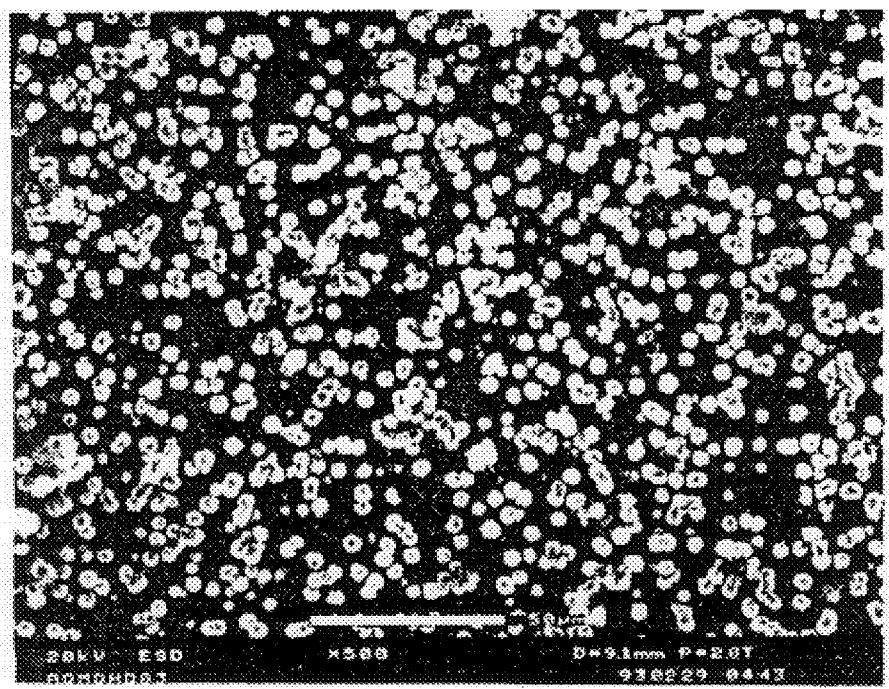
FIG. 28 is a representative SEM photomicrograph taken at about 500X of a material formed in accordance with Example 4, Sample E.
Figure 26:
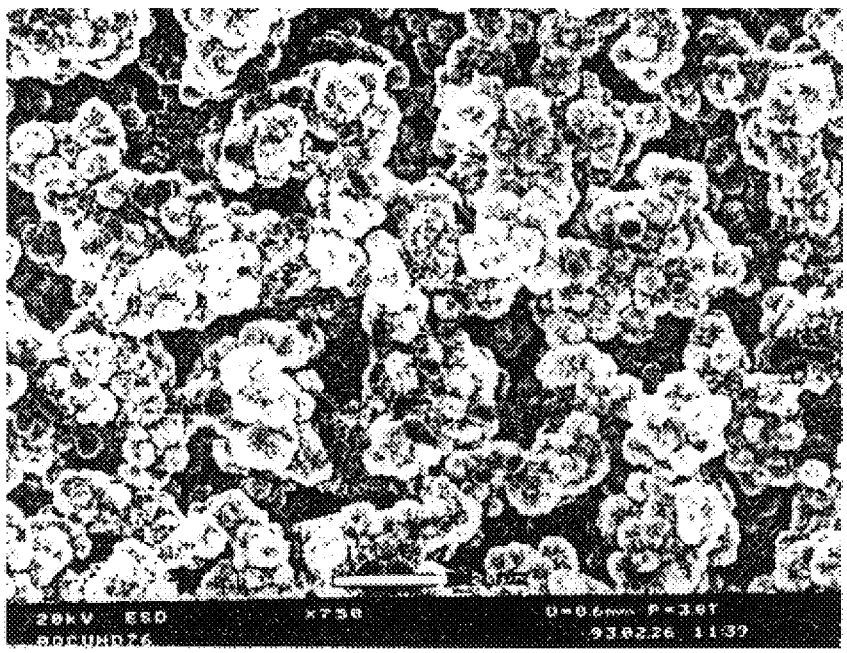
FIG. 26 is a representative SEM photomicrograph taken at about 750X of a material formed in accordance with Example 4, Sample E.
Figure 27:
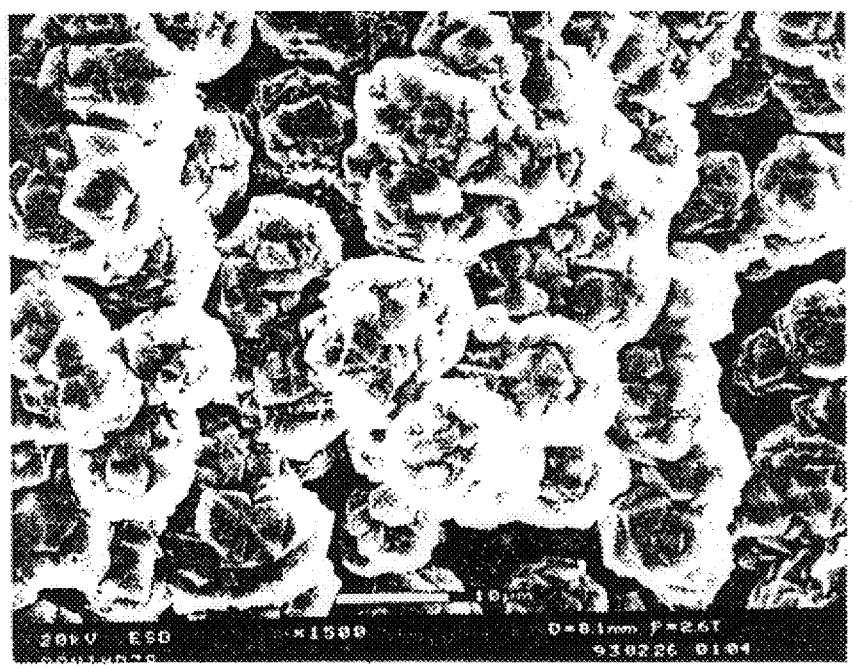
FIG. 27 is a representative SEM photomicrograph taken at about 1500X of a material formed in accordance with Example 4, Sample E.

FIGS. 26–28 are representative SEM photomicrographs of material formed utilizing copper, nickel and molybdenum powders, respectively, as the seeds in combination with a carbon source material comprising AQUA-DAG® E Colloidal graphite. The photomicrographs were taken at magnifications of 750 X, 1500 X, and 500 X, respectively.

Sample F

The process described in Example 3, Sample B was repeated with the difference being that instead of diamond powder as the seed material, about 0.05 gram of very fine β SiC (cubic phase) having an average particle diameter of about 1 $\mu$m (purchased from Johnson Matthey) was used as the seed material. The b SiC was mixed with about 5 grams of AQUA-DAG® E colloidal graphite. The processed substrate indicated a good conversion into diamond crystals.

Sample G

Essentially the same processes set forth in Example 3, Samples A and B were used, except that instead of ultra high purity $H_2$, and ultrahigh purity hydrogen and methane, a vapor comprising about 80% $H_2O$ and 20% $CH_3OH$ was utilized. The processed substrates indicated a good conversion into diamond crystals as shown by SEM, Raman and XRD characterization.

EXAMPLE 5

A seed material comprising about ten percent by weight of fine diamond powder having an average particle diameter of about 2 $\mu$m (supplied by Warren Diamond Powder Company) was mixed thoroughly a with carbon black source material and about 0.5% by weight of PVA binder to form a paste. The paste was dried in an air atmosphere oven at about 80° C. for about 2 hours and then at about 130° C. for about 10 minutes and then pressed into a die to form small right cylinders having a diameter of about 6.35 mm (¼ inch) and a thickness of about 3.18 mm (⅛ inch). In addition, the paste was pressed to about 2 mm thick tablets. One tablet was diced to form an about 2 mm×2 mm ×2 mm die. The die, one tablet and one right cylinder were slowly raised (over about one hours) into the plasma zone of the microwave reactor described in Example 1, and shown in FIG. 9. This caused all the fluids and polymeric binders to burn out slowly. The samples were reacted at about 950° C. for bout 10 hours, all other reaction conditions were substantially the same as described in Example 1. After cooling, the samples were examined by XRD, Raman and SEM. The samples were converted essentially to nearly pure diamond with several micron-sized crystals.

EXAMPLE 6

This Example demonstrates a further method for forming diamond according to the present invention by utilizing a microwave plasma assisted CVD reactor.

The following materials were added to a 125 ml glass beaker: about 1.8 grams of a carbon powder source material (VULCAN XC-72R Cabot Corporation, Boston, Mass.) having an average particle size of about 30 nm; about 0.2 gram of diamond seeds (Johnson Matthey, Ward Hill, Mass.) having an average particle sized of less than about 1 $\mu$m; about 50 ml of a solvent containing a mixture of about 70% by volume 1, 1, 1 tricholroethane and about 30% by volume 2-propanol (Aldridge, Milwaukee, Mich.), 99 + % purity. The contents of the beaker were stirred by hand utilizing a glass rod which previously was thoroughly cleaned with deionized water and dried. About 0.1 grams of a binder (Du Pont 5200) was added to the glass beaker. The glass beaker and its contents were subjected to an ultrasonic bath (Ultrasonics, L&R Manufacturing Company, Kearny, N.J.) for about 2 minutes.

A molybdenum substrate and a silicon substrate each measuring about 1.0 cm×1.0 cm and having a thickness of about 0.02 cm were cleaned in the following manner. Two 50 ml Pyrex® glass beakers were thoroughly cleaned with deionized water and then acetone and dried in an air atmosphere oven at about 100° C. for about 3 hours. Then about 25 ml of high purity acetone was placed into each 50 ml Pyrex® glass beaker. Utilizing a clean, fine tweezer, each substrate was placed into a separate beaker and submerged in the acetone. The beakers containing the acetone and the substrates were placed into an ultrasonic bath for about 3 minutes. After about 3 minutes, the glass beakers were removed from the ultrasonic bath and the acetone was removed from each beaker. About 20 ml of isopropanol were placed into each beaker and the substrates were submerged into the isopropanol. The beakers containing the isopropanol and the substrates were placed into the ultrasonic bath for about 3 minutes. The beakers were then removed from the ultrasonic bath and the substrates were removed from the beakers and dried at about room temperature.

Several milliliters of the carbon source/diamond seed mixture were removed from the 125 ml glass beaker utilizing a disposable plastic transfer pipet (Aldridge, Milwaukee, Mich.). Two drops (i.e., about 0.2 ml) of the carbon/diamond seed mixture were applied to about the center of one of the sides of each substrate, said substrates measuring about 1.0 cm×1.0 cm. Each substrate was then slightly tilted in all directions in order to spread the carbon/source diamond seed mixture over substantially the entire 1.0 cm×1.0 cm side of each substrate. A temperature of about 100° C. was established in an air atmosphere oven and each substrate was placed into the oven and allowed to dry substantially completely.

The same MPCVD described in Example 1 and depicted in FIG. 9 was utilized in this Example.

The coated silicon substrate was placed into the substrate holder with the coated side facing up. A gas flow rate of about 80 sccm of ultra pure hydrogen and about 20 sccm of a mixture of 10% methane, balance ultra pure hydrogen (i.e., a total gas flow rate of about 100 sccm) was established through the MPCVD. A reactor pressure of about 90 torr was established. The microwave power was turned on and the temperature of the coated silicon substrate was raised from about room temperature to about 975° C. in about 20 minutes, thus producing a plasma. The gas flow rate, reactor pressure and temperature were maintained for abut 5 hours. After about 5 hours, the microwave power was gradually reduced in about 10 minutes and then turned off; the substrate was allowed to cool to about room temperature; the pressure within the rector was increased to ambient; and the gas flow was interrupted completely. The silicon substrate was then removed from the substrate holder.

The coated molybdenum substrate was subjected to substantially the same reaction conditions as the coated silicon substrate.

The control settings of a Raman spectrograph (ISA RAM U-1000) were set as follows: laser wave length=514.532 nm; laser power=40 mw; slits=200 $\mu$m; increments=1.00 cm$^{-1}$; magnification=40 X; and NB scans=1.

Figure 10:
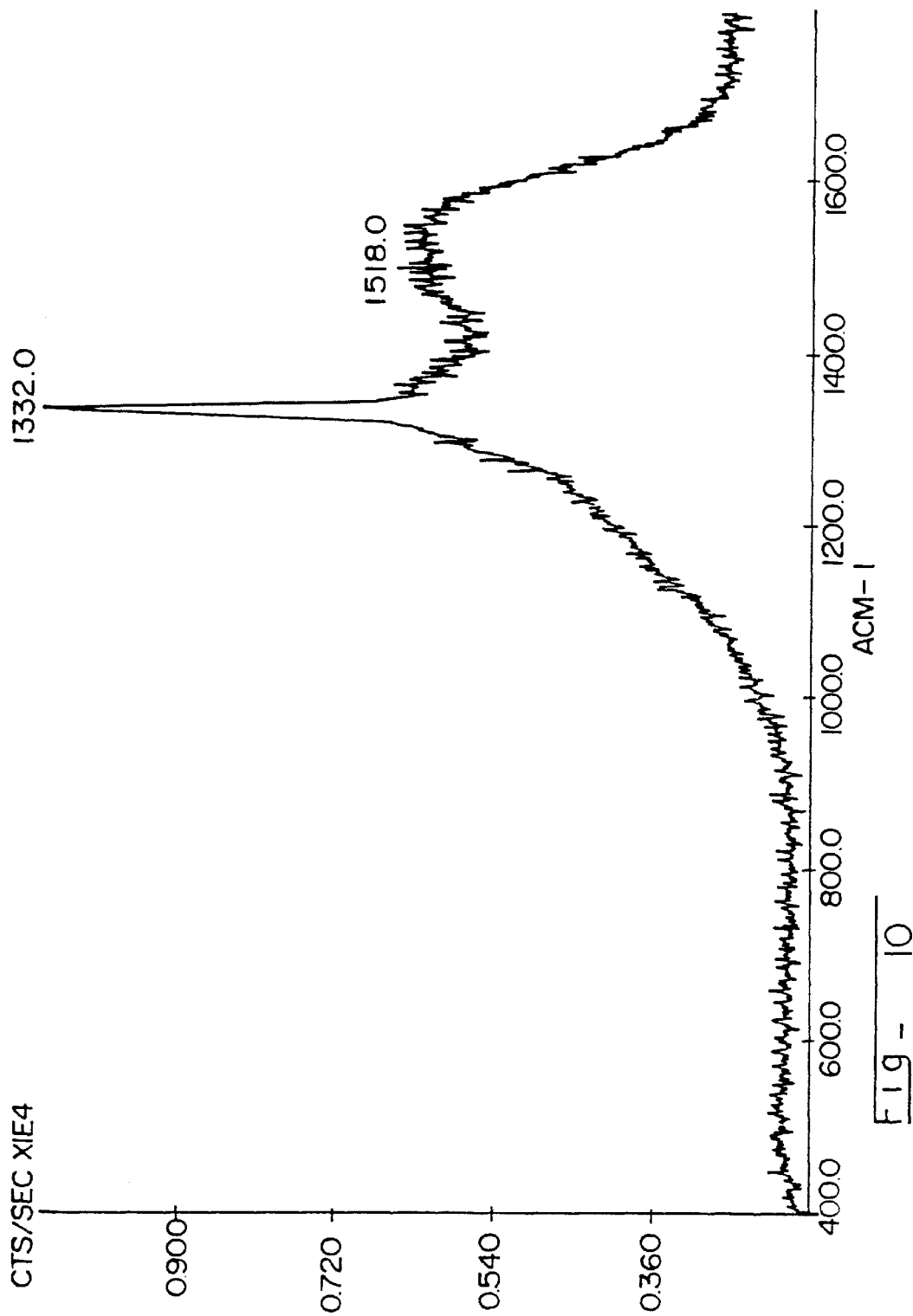
FIG. 10 is a Raman Spectrum of a material formed on a silicon substrate in accordance with the present invention as set forth in Example 6.
Figure 11:
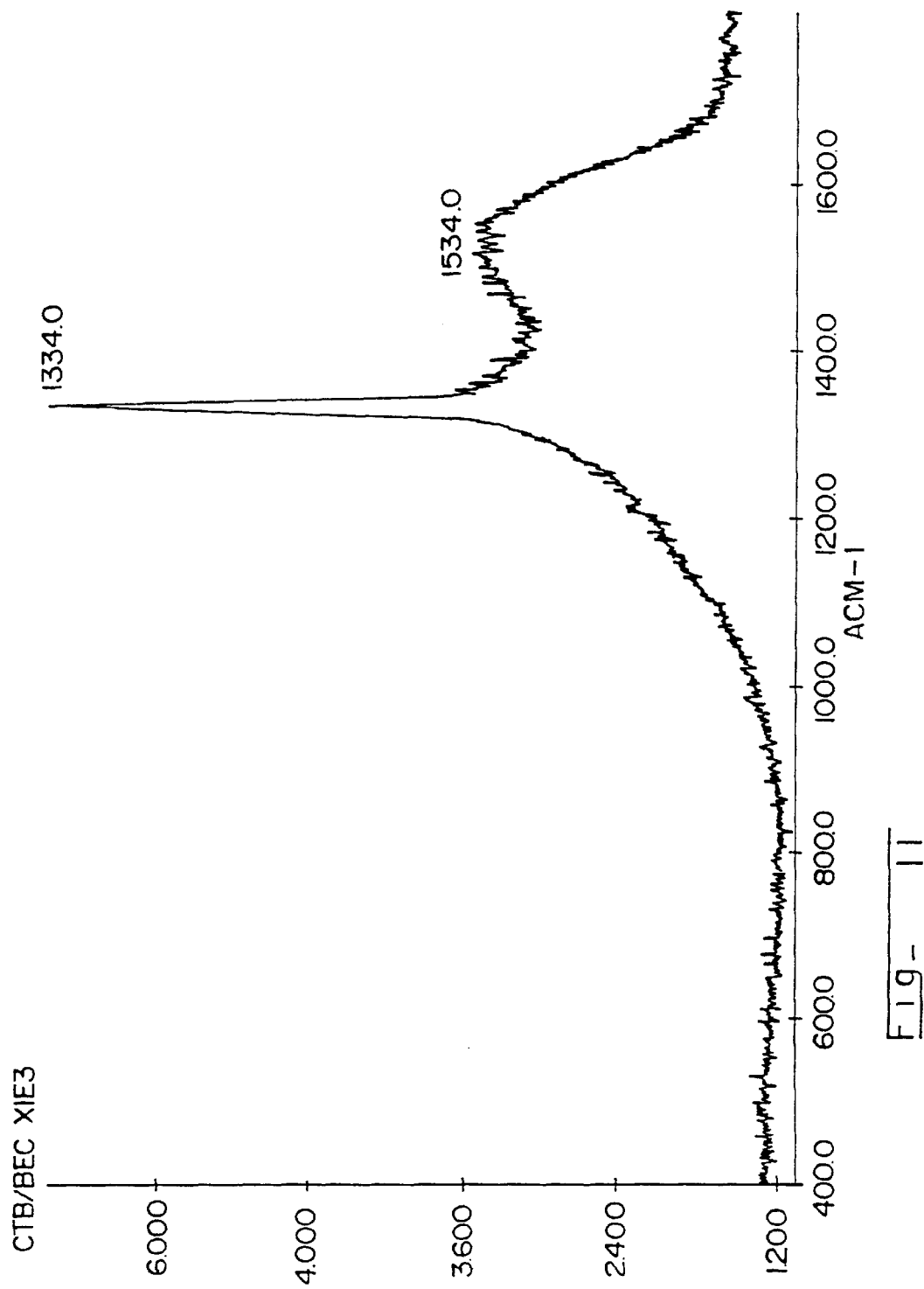
FIG. 11 is a Raman Spectrum of a material formed on a molybdenum substrate in accordance with the present invention as set forth in Example 6.

The coated side of each substrate was subjected to Raman spectroscopy and a very sharp Raman line around 1332 cm$^{-1}$ was obtained from the coating on each sample. This value corresponds to diamond crystals only. The spectrum also showed the presence of some residual graphitic carbon. The Raman spectrums of the samples on the silicon and molybdenum substrates are shown in FIGS. 10 and 11, respectively.

Figure 12:
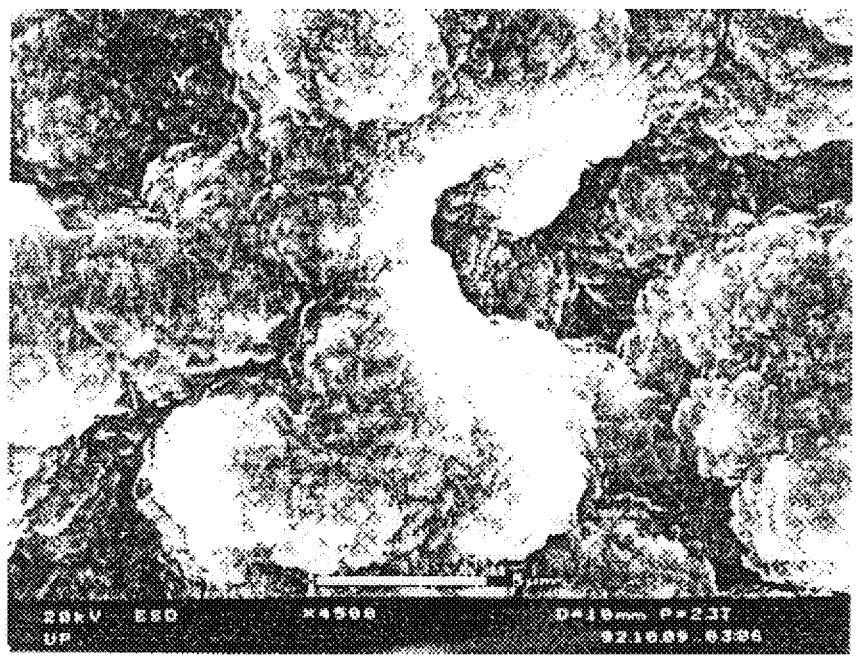
FIG. 12 is an SEM photomicrograph taken at about 4500X of the material formed on the silicon substrate in accordance with Example 6.
Figure 13:
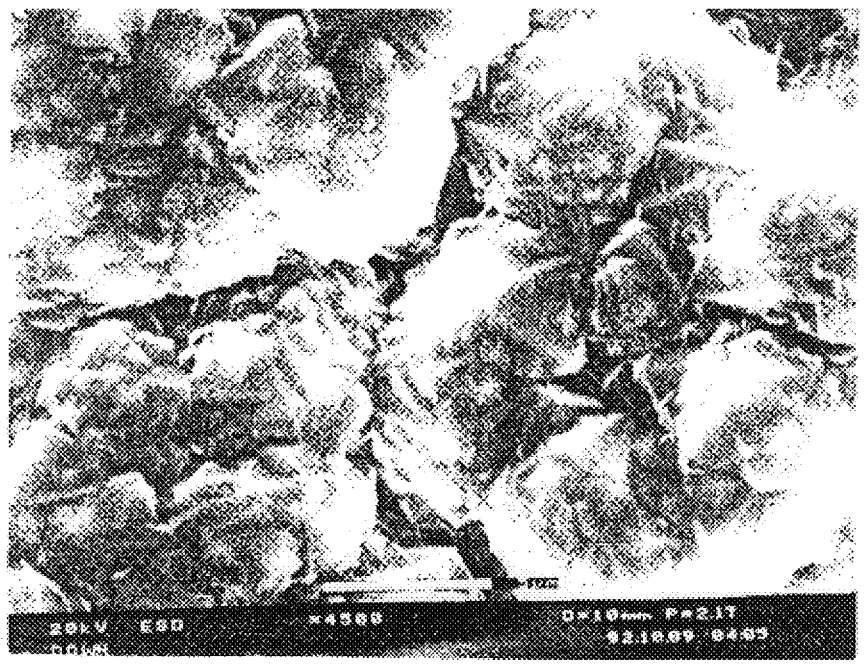
FIG. 13 is an SEM photomicrograph taken at about 4500X of the material formed on the molybdenum substrate in accordance with Example 6.

Also, scanning electron microscopy pictures were taken from the surface of the silicon and molybdenum substrate, as shown in FIGS. 12 and 13, respectively. FIGS. 12 and 13 demonstrate the polycrystalline morphology of the diamond coatings, their pure crystalline structure and good nucleation density. An environmental SEM (electronscan ES-30) and a high vacuum type SCM (ISI DS 130) were used for this purpose.

Finally, the coatings were analyzed using x-ray diffraction and the x-ray diffraction patterns showed a peak at d=0.2056 nm (2.058 Angstrom), which corresponds to diamond crystals, thus further confirming the quality of the diamond layer formed on each substrate.

EXAMPLE 7

This Example demonstrates a further method for forming diamond according to the present invention. Specifically, this Example utilizes a hydrogen/oxygen flame technique.

About 0.64 grams of AQUA-DAG® E colloidal graphite carbon source material (purchased from Ted Pella Inc., Tustin, Calif.) was placed into a 50 ml Nalgene® plastic beaker (Fisher Scientific, Pittsburgh, Pa.). About 0.025 grams of diamond seeds (Johnson Matthey) having an average particle size of less than about 1 $\mu$m and about 10 ml of deionized water were added to the Nalgene® plastic beaker. The contents of the beaker were stirred by hand utilizing a stainless steel spatula which had previously been thoroughly cleaned with deionized water and dried in an air atmosphere oven at about 100° C. The Nalgene® plastic beaker containing the AQUA-DAG® E source material/ diamond seed solution was subjected to an ultrasonic bath for about 3 minutes to sufficiently disperse the particles to form a diphasic solution.

About 3 drops of 20 weight percent polyvinyl alcohol binder (PolySciences, Inc., Warrington, Pa.), having a weight of about 0.21 gram, were added to a glass test tube. The binder was dissolved by adding about 3 ml of deionized water and then placing the test tube in an ultrasonic bath and subjecting the contents of the glass test tube to an ultrasonic bath for about 2 minutes. After about 2 minutes, the test tube was removed from the ultrasonic bath and the contents of the test tube were added to the AQUA-DAG® E source material/diamond seed diphasic solution contained in the Nalgene® plastic beaker. The Nalgene® plastic beaker and its contents were then subjected to an ultrasonic bath for about 2 minutes. After about 2 minutes, the Nalgene® plastic beaker was removed from the ultrasonic bath and the diphasic solution was transferred to a glass beaker. The glass beaker and its contents were then placed into an air atmosphere oven at a temperature of about 100° C. for about 2 hours. After about 2 hours and before the diphasic solution dried completely, the glass beaker was removed from the oven and small substantially spherical balls having an average diameter of about 1–2 mm were made by hand from the diphasic mixture. The substantially spherical balls were then placed into a clean petri dish and the petri dish containing the spherical balls was placed into the 100° C. air atmosphere oven for about 3 hours in order to dry the spherical balls substantially completely.

An about 1 cm diameter and 0.2 cm deep cavity was machined from a piece of high quality graphite in order to form a cavity for housing the spherical balls. A total of 6 spherical balls were placed into the cavity and a gas mixture of $H_2/O_2$ was used to create a flame through a burner tube. The $H_2/O_2$ ratio was adjusted in such a way that the flame would not force the spherical balls out of the cavity. The flame was directed towards the cavity so that the inner blue portion of the flame was concentrated on the spherical balls. It was noted that the spherical balls became white hot. After subjecting the spherical balls to the flame for about 4 minutes, the flame was removed from the spherical balls. The spherical balls were allowed to cool to room temperature and were thereafter ground using an agate mortar and pestle.

Figure 14:
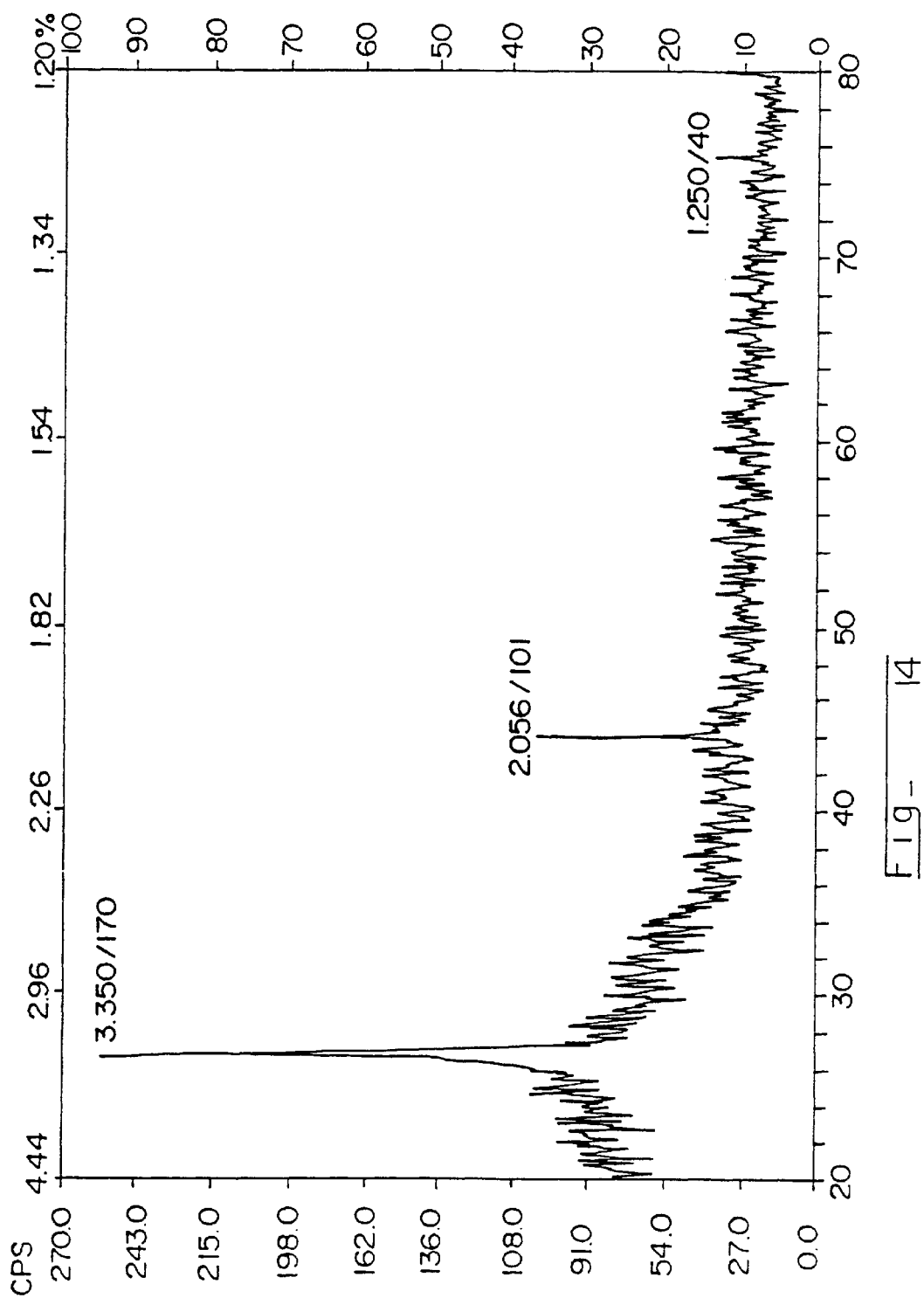
FIG. 14 is an x-ray powder diffraction pattern of the material formed in accordance with Example 7.

The ground spherical balls were then subjected to x-ray powder diffraction and the results are shown in FIG. 14. FIG. 14 shows the formation of a diamond phase apart from the graphite peak.

Figure 15:
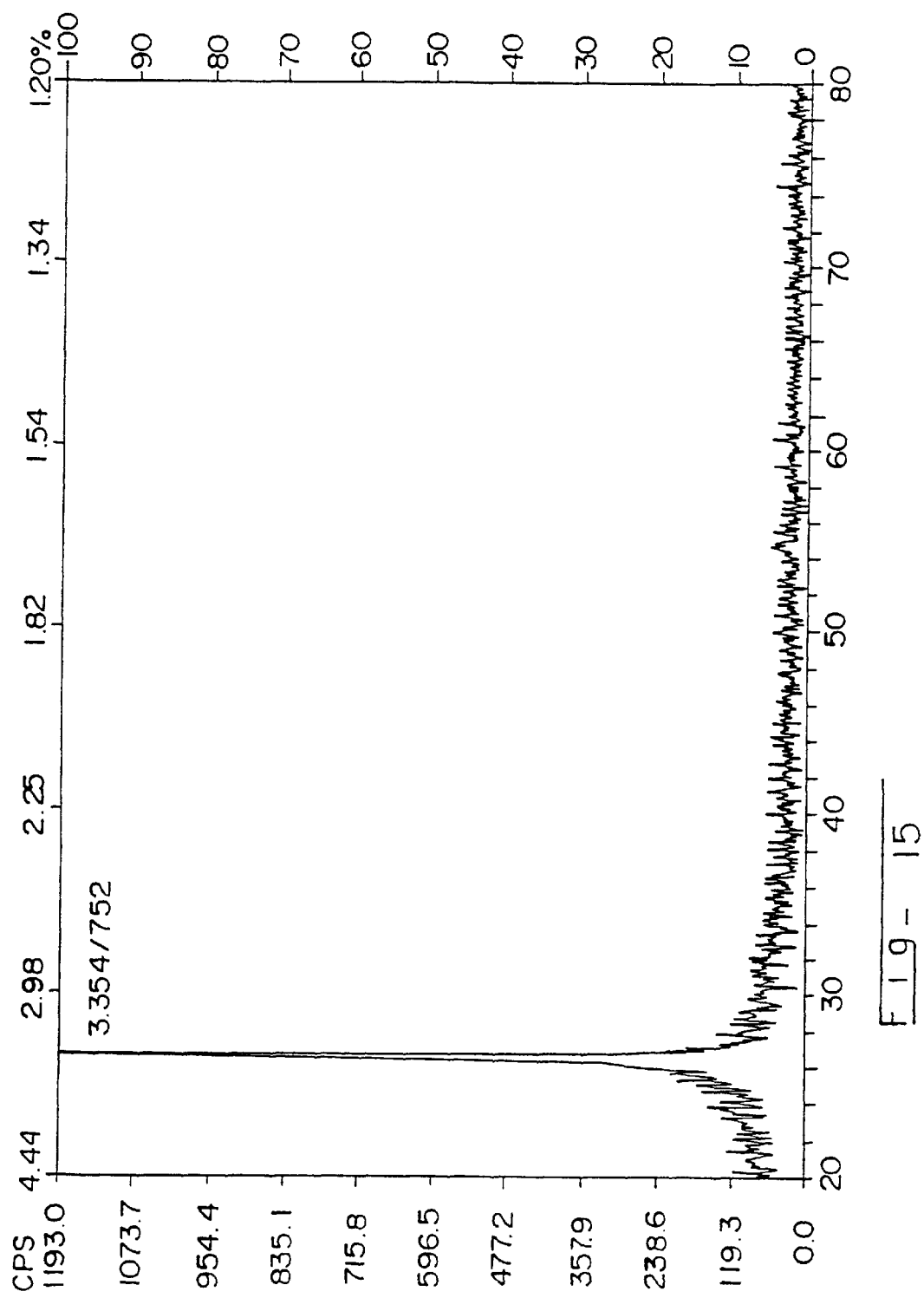
FIG. 15 is an x-ray diffraction pattern taken of the colloidal graphite/diamond seed/polyvinyl alcohol binder spherical balls of Example 7 before the hydrogen/oxygen flame treatment.

FIG. 15 shows the results of x-ray powder diffraction analysis of the spherical balls before being subjected to the above flame treatment. As shown in FIG. 15, the x-ray powder diffraction pattern of the spherical balls before the flame treatment shows only the graphite peak.

Figure 16A:
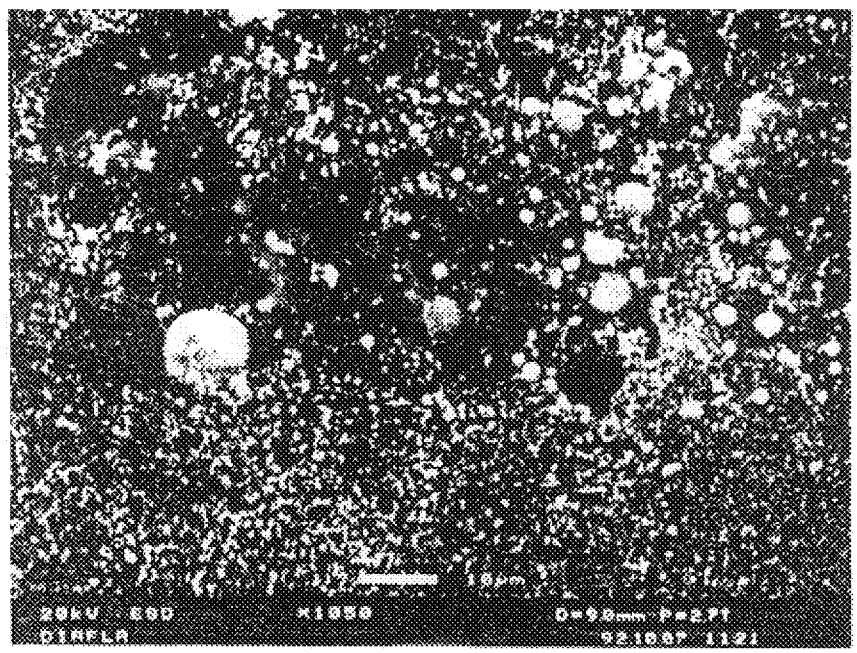
FIGS. 16a and 16b are SEM photomicrographs of the material formed in accordance with Example 7.
Figure 16B:
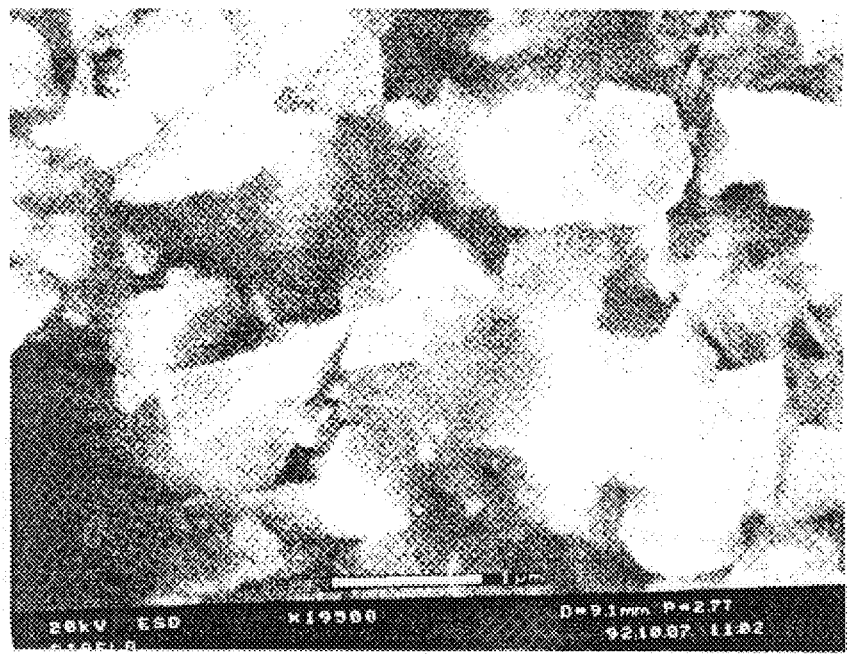

FIGS. 16*a* and 16*b* show the results of scanning electron micrograph (SEM) of the spherical balls after the above flame treatment. An environmental SEM (electroscan ES-30) was used for this purpose.

EXAMPLE 8

Figure 6:
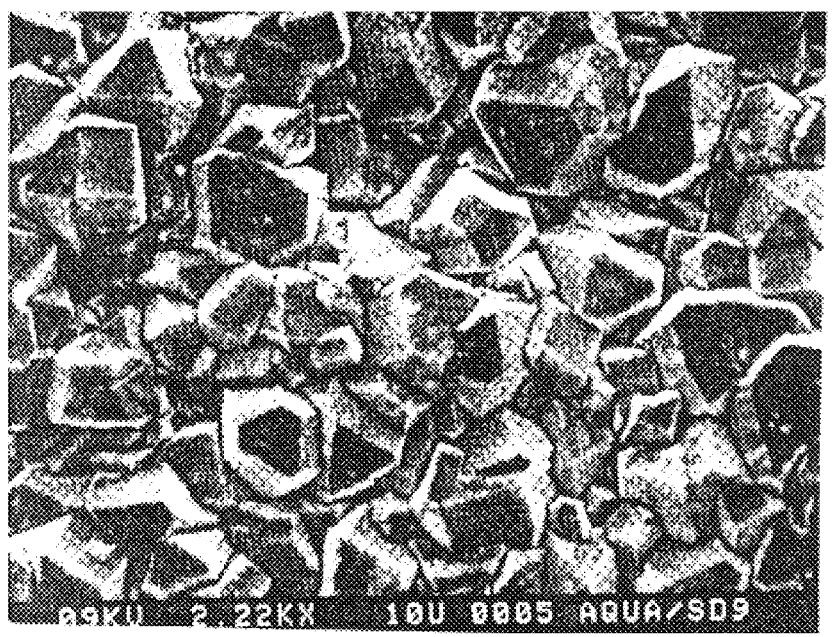
FIG. 6 is an SEM photomicrograph taken at about 2220X of the material formed in accordance with Example 8.
Figure 8:
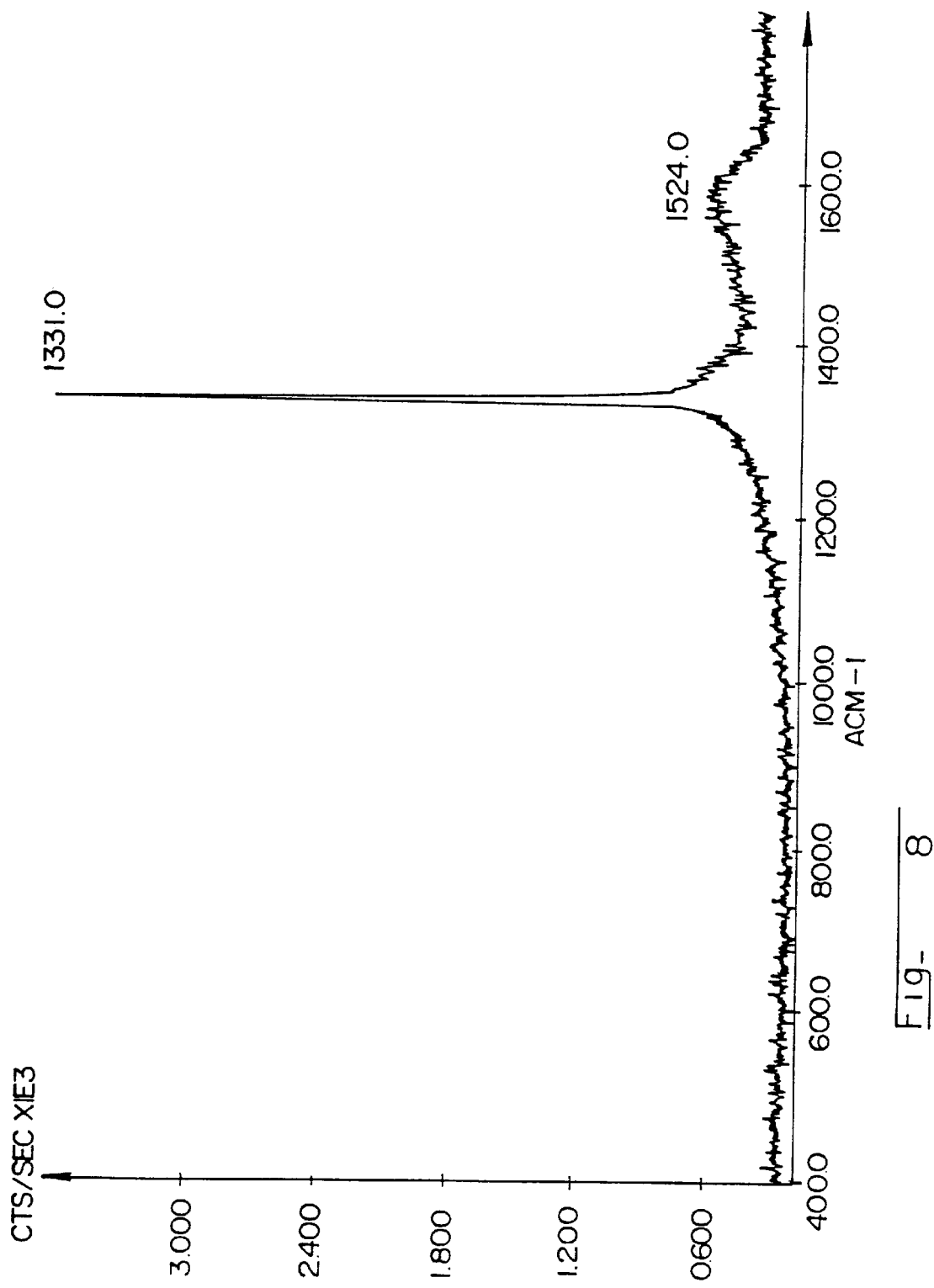
FIG. 8 is a Raman Spectrum of a material formed in accordance with Example 8.

A seed material comprising approximately 5% (solids by wt.) of fine diamond powder (average particle size ≤1 μm, purchased from Johnson Matthey) was added to and dispersed within a sample of an AQUA-DAG® E colloidal graphite carbon source. The mixture was spread onto a silicon wafer (prepared and cleaned essentially as described in Example 1) with a spatula and allowed to dry substantially completely for about 12 hours at about room temperature in a desiccator. The coated wafer was then introduced into a standard microwave Astex reactor (described in Example 9). The reactor was evacuated to about 0.001 torr (mm Hg) and the pressure was then raised to about 20 torr utilizing ultrahigh purity hydrogen gas. A gas flow rate, comprising about 99% ultrahigh purity hydrogen and about 1% methane, of about 100 sccm was established through the reactor. The microwave power from the microwave power generator was turned on and the temperature of the graphite substrate was raised from about room temperature to about 950° C. The microwave power generator was tuned to produce a plasma in the reaction chamber and the coated wafer was slowly moved into the plasma. After reaction for about 20 hours the wafer was removed from the reactor and characterized by optical microscopy, SEM microscopy, XRD, and Raman spectroscopy. The formed body was about 25 1 thick and was essentially completely converted to diamond, as shown by the SEM photomicrograph of FIG. 6 and the Raman pattern of FIG. 8. The above steps were repeated to result in sequential additions of 25 1 (final diamond thickness) layers, thus resulting in the build up of thicker freestanding films.

EXAMPLE 9

This example demonstrates a method for forming diamond fibers according to the method of the present invention.

A first carbon source material comprising an about 4 gram sample of AQUA-DAG® E Colloidal graphite (Acheson Colloids Company) was placed into a 50 ml Nalgene® beaker (purchased from Fisher Scientific). About 0.05 gram of a diamond seed material (purchased from Johnson Matthey, Ward Hill, Mass.), having an average particle size of about ≤1 micron, and a second seed material comprising about 0.1 gram of (−120 U.S. Standard mesh) nickel particles having a diameter of about 106 microns or less (purchased from Johnson Matthey, Ward Hill, Mass.), were added to the Nalgene® beaker, 10 ml of deionized water, having a resistivity of about 4 M ohms, was added to the Nalgene® beaker and the contents of the beaker was stirred utilizing a stainless steel spatula which had been thoroughly cleaned with deionized water and dried in an oven at about 100° C. The contents of the Nalgene® beaker was then subjected to an ultrasonic bath for about three minutes in order to disperse the particles to produce a triphasic solution.

A second carbon source material comprising a small bundle of carbon fibers (procured form the United States Navy and identified as "Type AS 4 12 K") having a length of about 25.4 nm (1 ") and an average fiber diameter of about 10 microns, and weighing about 0.0004 gram were dipped into the solution such that substantially all of the surfaces of each carbon fiber was coated with the triphasic solution. The coated fibers were then dried overnight at room temperature.

A boron nitride holder for holding the coated fibers was prepared by machining an about 3.18 mm (⅛ inch) diameter cylindrical hole into a boron nitride rod (purchased from Union Carbide, Cleveland, Ohio) having a diameter of about 25.4 mm (1 ") and a length of about 9.53 mm (⅜ "). The dried bundle of fibers was placed into the cylindrical hole and the boron nitride holder was placed onto a graphite plate. The graphite plate and boron nitride holder containing the bundle of fibers were placed into the reaction chamber of an Astex System microwave plasma assisted chemical vapor deposition reactor (purchased from Applied Science & Technology, Inc., Woburn, Mass.).

Figure 29:
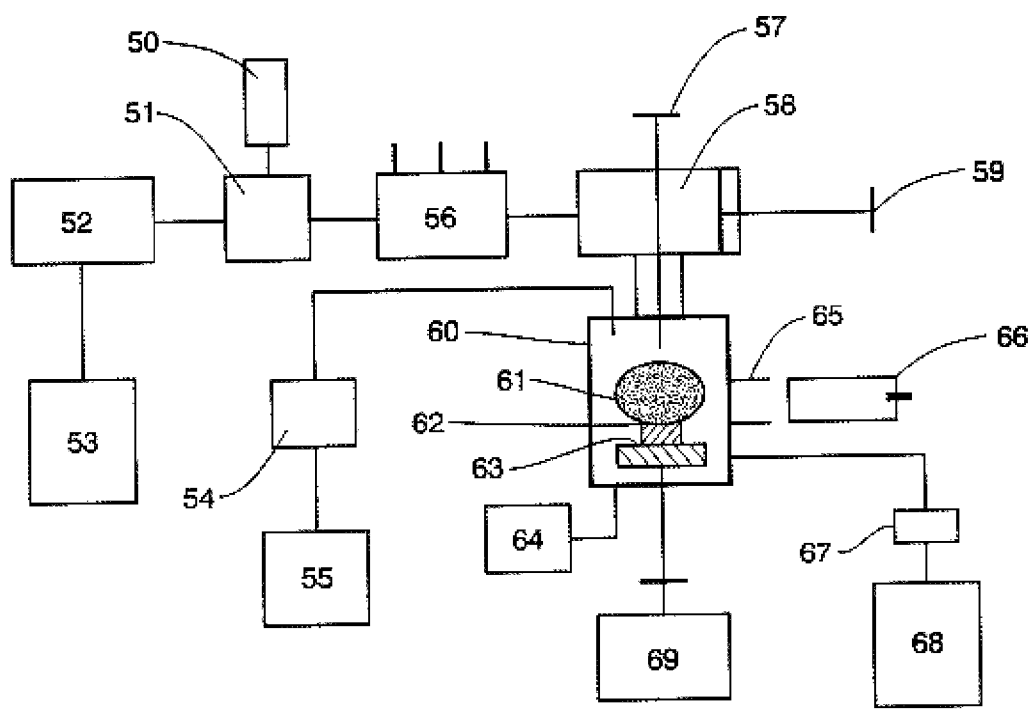
FIG. 29 is a schematic view of the Astex microwave plasma assisted chemical vapor deposition reactor which was utilized in Example 9.

FIG. 29 is a schematic view of the Astex System microwave plasma assisted chemical vapor deposition reactor which was utilized in this example. Table III provides in tabular form a list of the different components of the Astex System shown in FIG. 29, wherein the reference numerals utilized in FIG. 29, are cross referenced to the different components of the Astex System.

TABLE III

| Reference Numerals | Component Parts |
| --- | --- |
| 50 | Load |
| 51 | Circulator |
| 52 | Microwave Source |
| 53 | Power Supply |
| 54 | Mass-flow Controllers |
| 55 | Gas Cylinders |
| 56 | 3-Stub Tuner |
| 57 | Antenna Probe Adjustment |
| 58 | Coaxial Transition |
| 59 | Tuner |
| 60 | Reactor Cavity |
| 61 | Plasma |
| 62 | Substrate |
| 63 | Heater |
| 64 | Temperature Control Gauge |
| 65 | Optical Window |
| 66 | Pyrometer |
| 67 | Throttle Valve |
| 68 | Vacuum Pump |
| 69 | Substrate Heater Raise-Lower System |

The reactor 60 was evacuated to about 0.001 torr (mm of Hg) and the pressure was then raised to about 20 torr utilizing ultra high purity hydrogen gas. A hydrogen gas flow rate of about 100 SCCM was established through the reactor 60. The microwave power from the microwave power source 52 was turned on and the temperature of the graphite substrate 62 was raised from about room temperature to about 800° C. The microwave power source 52 was tuned to produce a plasma 61 in the reaction chamber 60. The gas flow rate, pressure and temperature were maintained for about 20 hours. After about 20 hours, the microwave power was gradually reduced and then turned off; the substrate temperature was reduced to about room temperature; the pressure within the reactor was increased to ambient; and the gas flow rate was interrupted completely. The graphite plate, boron nitride holder and bundle of fibers were removed and the fibers were removed from the boron nitride holder.

The fibers were analyzed utilizing a Raman Spectrograph (Model ISA RAM U-1000). The control settings of the Raman spectrograph were set as follows: laser wavelength= 514,532 nm; laser power=200 mm; slits=200 µm; increment=1.00 cm$^{-1}$; magnification=40x; NB scans=1.

Figure 30:
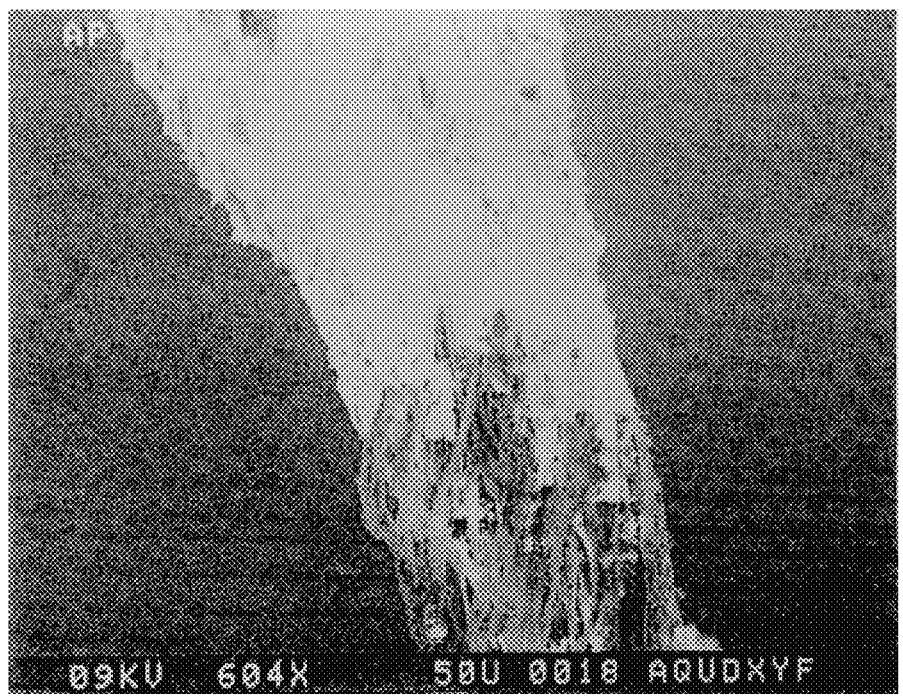
FIG. 30 is an SEM photomicrograph taken at about 604X of the material formed in accordance with Example 9.
Figure 31:
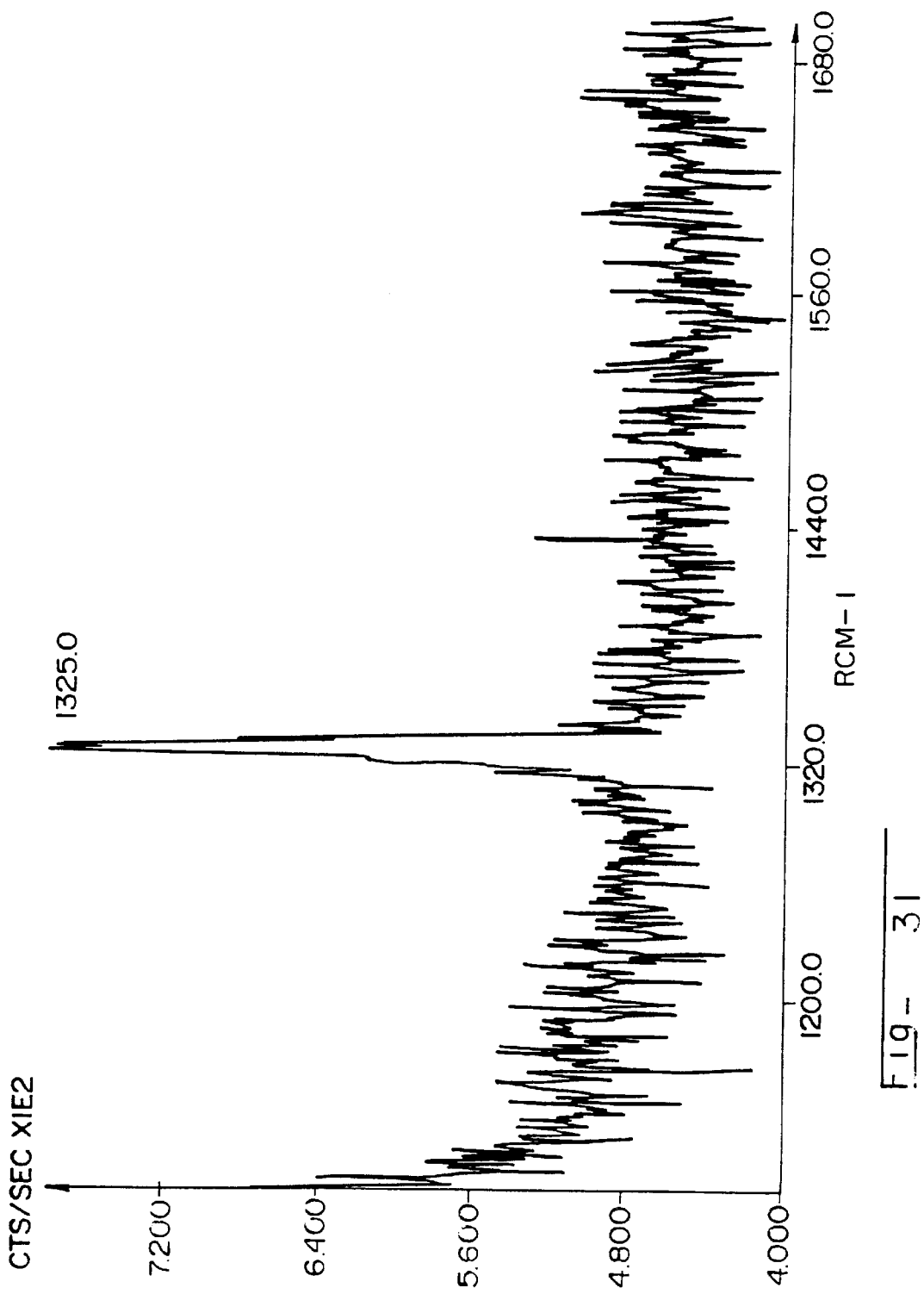
FIG. 31 is a Raman Spectrum of the material formed in accordance with Example 9.

The fibers were subjected to Raman spectroscopy and a very sharp Raman line of about 1325 cm$^{-1}$ was obtained, which corresponds to diamond crystals only. SEM photomicrograph taken at 640x of one of the fibers is shown in FIG. 30. Showing part of the fibers are converted to diamond which were exposed to the plasma and part of them are not converted. The Raman spectra of the converted part is shown in FIG. 31.

EXAMPLE 10

This example demonstrates a method for forming diamond fibers according to the method of the present invention.

A seed material precursor comprising about 0.66 gram nickel nitrate hexa hydrate (Ni(NO$_3$)$_2$.6H$_2$O) (purchased from Aldrich Chemical Company) was dissolved in about 1 ml of deionized water. A carbon source material comprising a small bundle of carbon fibers (procured from the United States Navy and identified as "Type AS4 12K") having a length of about 25.4 mm (1") and an average fiber diameter of about 10 microns, were dipped into the solution such that substantially all of the surfaces of each carbon fiber was coated with the solution. The coated fibers were then dried overnight at room temperature.

A boron nitride holder for holding the coated fibers was prepared by machining an about 3.18 mm (⅛ inch) diameter cylindrical hole into a boron nitride rod (purchased from Union Carbide, Cleveland, Ohio) having a diameter of about 25.4 mm (1") and a length of about 9.53 mm (⅜"). The dried bundle of fibers were placed into the cylindrical hole and the boron nitride holder was placed onto a graphite plate. The graphite plate and boron nitride holder containing the bundle of fibers were placed into the reaction chamber of an Astex System microwave plasma assisted chemical vapor deposition reactor (purchased from Applied Science & Technology, Inc., Woburn, Mass.).

The reactor was evacuated to about 0.001 torr (mm of Hg) and then a reactor pressure of about 20 torr was established utilizing ultra high purity hydrogen gas. The temperature of the graphite plate was raised to about 500° C. and held at this temperature for about 5 hours. After about 5 hours, the temperature was increased to about 880° C. A hydrogen gas flow rate of about 100 SCCM was established through the reactor. The microwave power from a microwave power generator was turned on and tuned to produce a plasma in the reaction chamber. The gas flow rate, pressure and temperature were maintained for about 20 hours. After about 20 hours, the microwave power was gradually reduced and then turned off; the substrate temperature was reduced to about room temperature; the pressure within the reactor was increased to ambient; and the gas flow rate was interrupted complete. The graphite plate, boron nitride holder and bundle of fibers were removed and the fibers were removed from the boron nitride holder.

Figure 17:
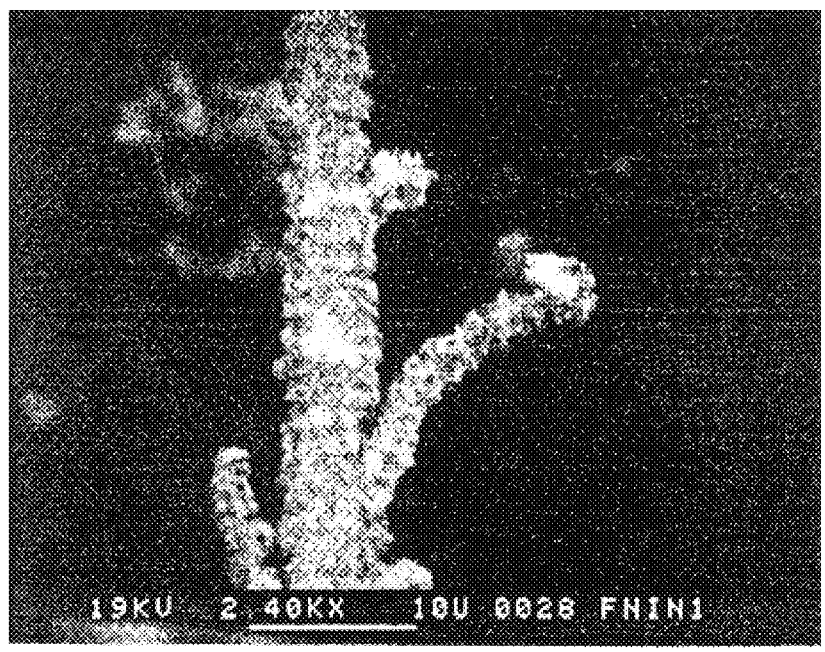
FIG. 17 is an SEM photomicrograph taken at about 2400X of the material formed in accordance with Example 10.

FIG. 17 is an SEM photomicrograph taken at about 240x of one of the fibers in this example.

EXAMPLE 11

This example demonstrates a method for forming diamond fibers according to the method of the present invention.

A seed material comprising about 0.05 gram of (−120 mesh) nickel powder having a diameter of about 106 microns or less (purchased from Johnson Matthey, Ward Hill, Mass.) and about 2 ml of deionized water were placed into a 50 ml Nalgene® beaker (purchased from Fisher Scientific). The nickel powder was dispersed by subjecting the beaker and its contents to an ultrasonic bath for about 3 minutes.

A carbon source material comprising a small bundle of carbon fibers (procured from the United States Navy and identified as "Type AS4 12K") having a length of about 25.4 mm (1") and an average fiber diameter of about 10 microns were dipped into the sol such that substantially all of the surfaces of each carbon fiber was coated with the nickel sol. The coated fibers were then dried overnight at about room temperature.

Essentially the same process used in Example #9 was used, except that the reaction temperature was about 900° C. and the reaction time was about 22 hours.

Figure 18:
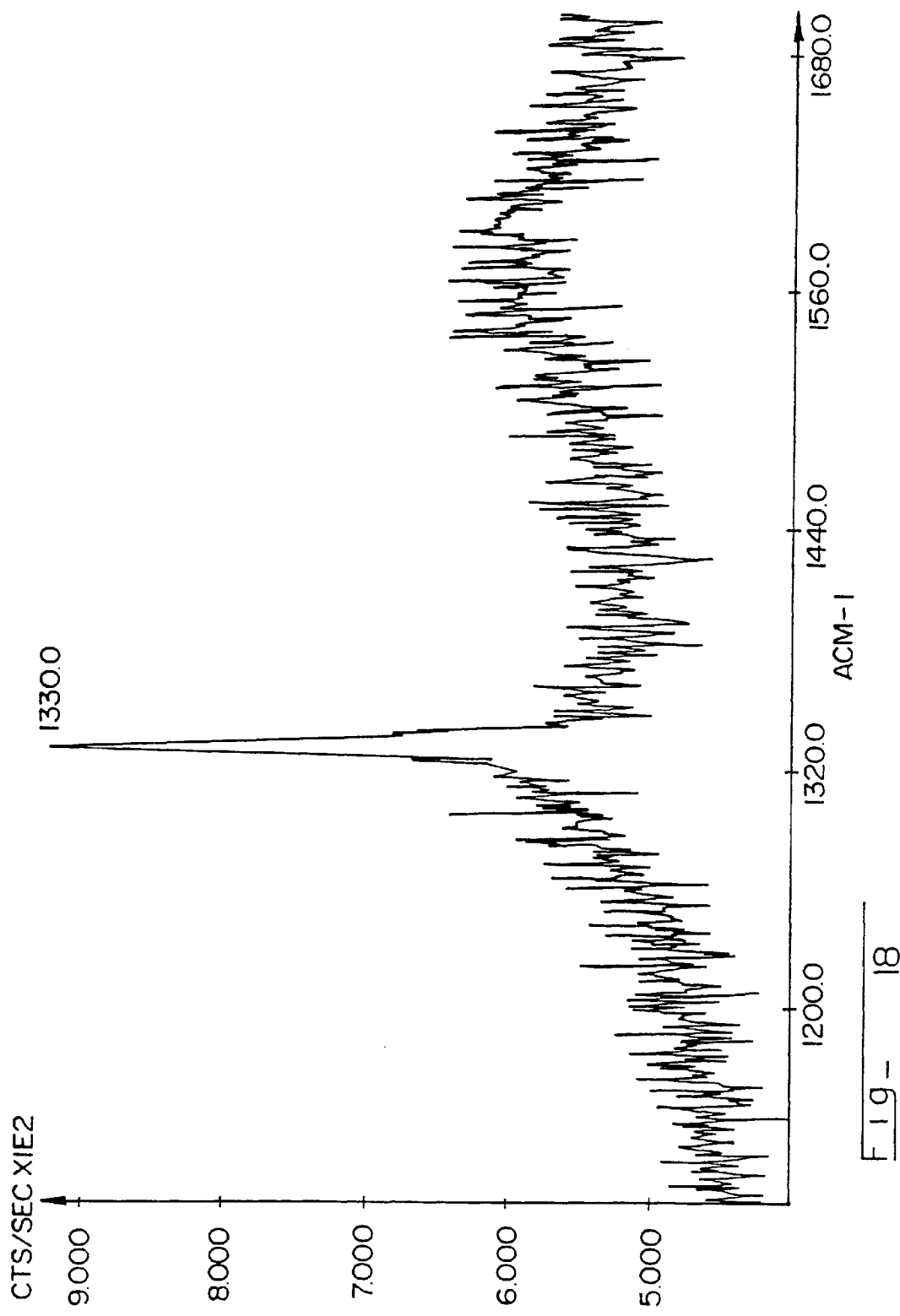
FIG. 18 is a Raman spectrum of the material formed in accordance with Example 11.

The fibers were subjected to Raman spectroscopy and, as shown in FIG. 18, a very sharp Raman line around 1333 cm$^{-1}$ was obtained.

Figure 19:
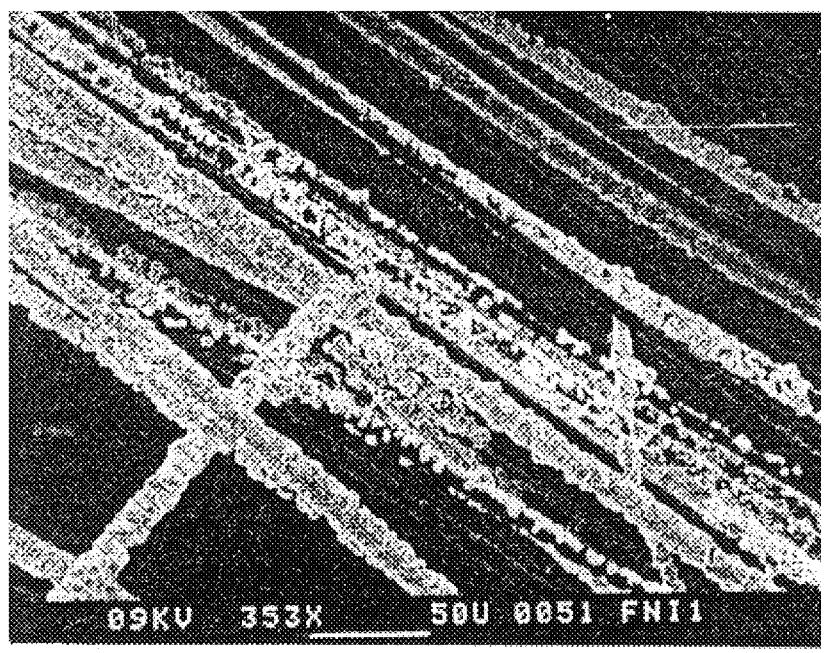
FIG. 19 is an SEM photomicrograph taken at about 353X of the material formed in accordance with Example 11.

FIG. 19 is an SEM photomicrograph taken at about 353x of a sample of the fibers produced in this example.

EXAMPLE 12

This example demonstrates a method for forming diamond fibers according to the method of the present invention.

A first carbon source material comprising an about 4 gram sample of AQUADAG® E Colloidal graphite (Acheson Colloids Company) was placed into a 50 ml NALGENE® beaker (purchased from Fisher Scientific). About 0.05 gram of diamond seeds (purchased from Johnson Matthey, Ward Hill, Mass.), having an average particle size of <1 micron, were added to the NALGENE® beaker. About 10 ml of deionized water, having a resistivity of about 4 M ohms, was added to the NALGENE® beaker and the contents of the beaker were stirred utilizing a stainless steel spatula which had been thoroughly cleaned with deionized water and dried in an oven at about 100° C. The contents of the NALGENE® beaker were then subjected to an ultrasonic bath for about three minutes in order to disperse the particles to produce a diphasic solution.

A second carbon source material comprising a small bundle of carbon fibers (procured from the United States Navy and identified as "Type AS4 12K") each having a length of about 2.5 cm and an average fiber diameter of about 10 microns were dipped into the diphasic solution such that substantially all of the surfaces of each carbon fiber was coated with the diphasic solution. The coated fibers were then dried overnight at room temperature.

Essentially the same process used in Example 9 was used, except that the reaction temperature was about 900° C. and the reaction time was about 22 hours.

The fibers were analyzed utilizing a Raman Spectrograph (Model ISA RAM U-1000). The control settings of the Raman spectrograph were set as follows: laser wavelength= 514.532 nm; laser power=200 mw; slits=200 $\mu$m; increment=1.00 cm$^{-1}$; magnification=40x; NB scans=1.

The fibers were subjected to Raman spectroscopy and a very sharp Raman line around 1325 cm$^{-1}$ was obtained, which corresponds to diamond crystals only.

Figure 20:
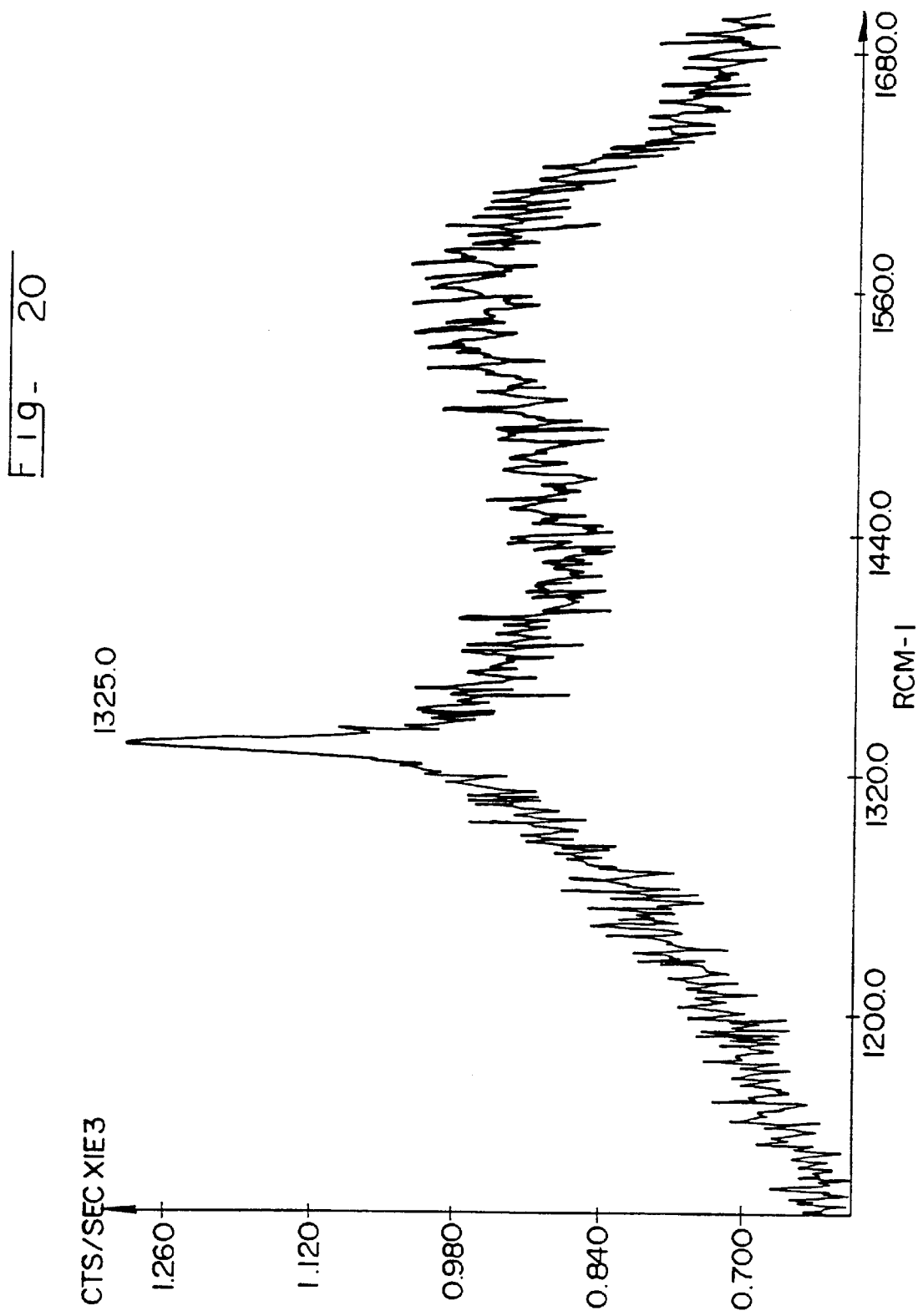
FIG. 20 is a Raman spectrum of the material formed in accordance with Example 12.
Figure 21:
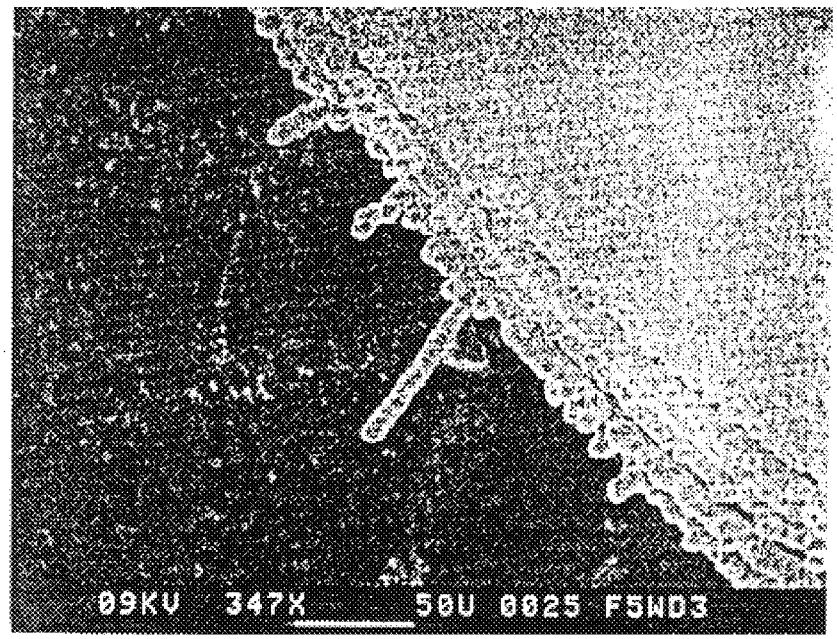
FIG. 21 is an SEM photomicrograph taken at about 347X of the material formed in accordance with Example 12.
Figure 22:
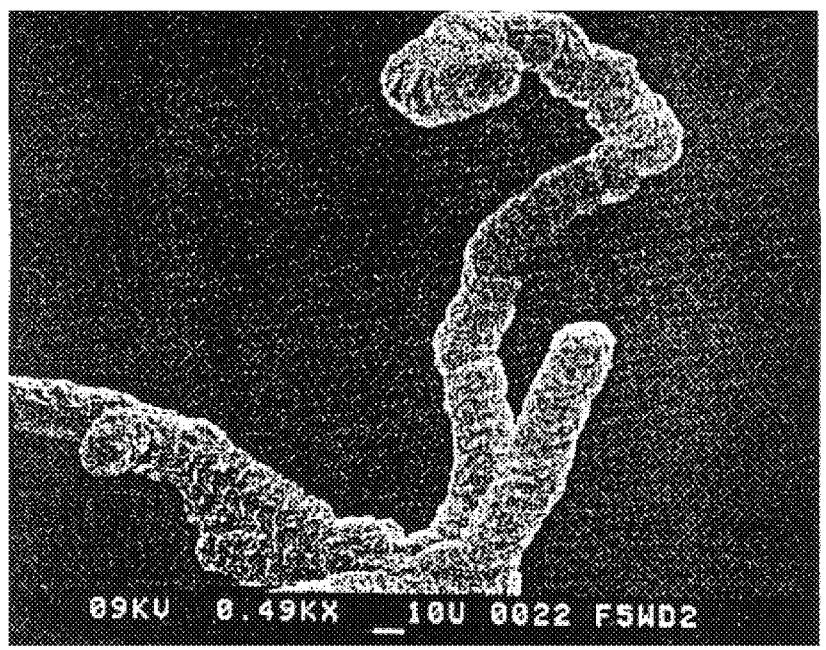
FIG. 22 is an SEM photomicrograph taken at about 490X of the material formed in accordance with Example 12.

FIG. 20 is a Raman Spectrum of the material formed in this example. FIGS. 21 and 22 are SEM photomicrographs taken at about 347x and 490x, respectively, of the fibers produced in this example.

EXAMPLE 13

This example demonstrates a method for forming diamond fibers according to the method of the present invention.

A seed material comprising about 0.03 gram of diamond powder and about 2 ml of deionized water were placed into a 50 ml NALGENE® beaker (purchased from Fischer Scientific). The diamond powder was dispered by subjecting the beaker and its contents to an ultrasonic bath for about 3 minutes.

A small bundle of carbon fibers (procured from the United States Navy and identified as "Type AS4 12K") each having a length of about 2.5 cm and an average fiber diameter of about 10 microns, were dipped into the solution such that substantially all of the surfaces of each carbon fiber was coated with the sol. The coated fibers were then dried overnight at room temperature.

Essentially the same process used in Example 9 was used.

The fibers were analyzed utilizing a Raman Spectrograph (Model ISA RAM U-1000). The control settings of the Raman spectrograph were set as follows: laser wavelength= 514.532 nm; laser power=200 mw; slits=200 $\mu$m; increment=1.00 cm$^{-1}$; magnification=40x; NB scans=1.

The fibers were subjected to Raman spectroscopy and a very sharp Raman line around 1335 cm$^{-1}$ was obtained.

EXAMPLE 14

Figure 32:
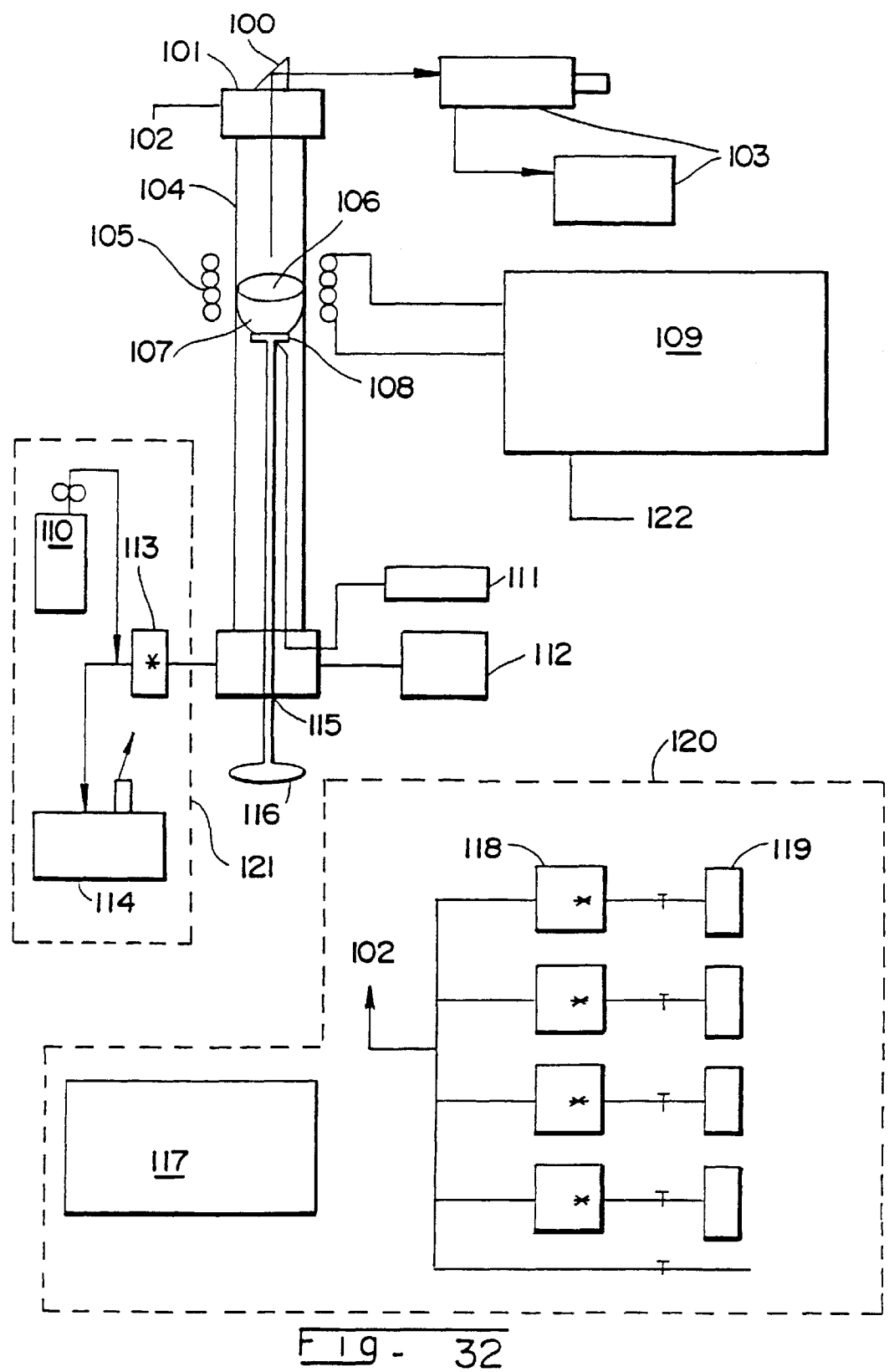
FIG. 32 is a schematic view of the hot filament type diamond deposition/conversion system which was utilized in Example 14.

FIG. 32 is a schematic view of a hot filament type diamond deposition/conversion system which was utilized in this example. Table IV provides in tabular form a list of the different components of the system shown in FIG. 32, wherein the reference numerals utilized in FIG. 32 are cross referenced to the different components of the system.

TABLE IV

| Reference Numerals | Component Parts |
| --- | --- |
| 100 | Quartz Prism |
| 101 | Optical Window |
| 102 | Gas Inlet Tube |
| 103 | Optical Pyrometer |
| 104 | Quartz Tube |
| 105 | R.F. Coil |
| 106 | Hot Filament |
| 107 | Plasma |
| 108 | Substrate Holder |
| 109 | Radio Frequency Power Generator |
| 110 | Nitrogen Cylinder |
| 111 | Thermocouple gauge |
| 112 | Pressure Transducer |
| 113 | Exhaust Valve |
| 114 | Vacuum Pump |
| 115 | Vacuum-tight Movable Joint |
| 116 | Substrate Adjustment |
| 117 | Electronic Control Circuits |
| 118 | Mass Flow Controllers |
| 119 | Gas Cylinders |
| 120 | Gas Flow Inlet Control System |
| 121 | Exhaust System |
| 122 | Water Supply |

In the hot filament type diamond deposition/conversion system, the active species are produced by bringing the hydrogen and carbon containing vapor (in this example methane gas, which is used in combination with the solid carbon source material in this example) in contact with a very hot filament structure (around 2000° C.). The substrate material, a dried-up sol of different types of carbon source seeded with diamond seeds, metallic or nonmetallic seed powders, was kept very close to the hot filament to interact with the active species to form diamond crystals.

Referring to FIG. 32 the hot filament reactor system comprises a carburized tantalum wire heater 106 in the form of a circular gauze which was heated by R.F. induction heating by R.F. coil 105 connected to a radio-frequency (450 kHz) power generator (10 KW) 109. The coil 105 is placed outside the quartz tube reactor 104 close to the position of the tantalum wire heater grid 106.

A silicon substrate material was prepared essentially as described in Example 3, Sample A. The substrate was placed on the substrate holder 108 and raised into the reactor tube 104, keeping it at about 1 cm below the hot filament 106. A gas comprising ultrahigh purity hydrogen with 1% methane was utilized to establish a gas flow rate of about 200 sccm through the reactor and a pressure of about 30 torr. The flow rate and pressure were maintained by the automatic flow and pressure controllers. The RF power from the radio-frequency generator 109 was adjusted to achieve a temperature of about 2200° C. at the tantalum filament grid 106 as indicated by the optical pyrometer 103. The position of the RF coil 105 was also adjusted to achieve a substrate temperature of about 950° C. as indicated by the thermocouple 111 attached to the bottom of the substrate through a hole in the substrate holder.

The gas flow rate, gas pressure and temperatures of the tantalum filament and substrate were maintained for a period of about 6 hours after which the heating power was switched off to cool down the reacted substrate. The substrate was then characterized by Raman, SEM, and XRD which showed the presence of a good polycrystalline diamond coating.

EXAMPLE 15

This example demonstrates a method for forming diamond by utilizing an internal atomic hydrogen source by a non-plasma assisted conversion.

Specifically, a carbon source material comprising about 5 grams of AQUA-DAG® E colloidal graphite (Acheson Colloids Company, MI) was weighed in a clean 30 ml Pyrex® glass beaker. To this AQUA-DAG® E was added a seed material comprising about 0.25 g of diamond powder (particle size about 2 micron, Type 300S supplied by Warren Diamond Powder Co. Inc.). While stirring this with a cleaned stainless steel spatula, about 15 ml of deionized water was added. This mixture was given ultrasonic agitation for about 15 minutes in an ultrasonic bath (manufactured by Geoscience Instruments Corporation, NY). The diphasic sol was poured into a clean glass petri dish. The petri dish was maintained in an air atmosphere oven kept at about 80° C. for about two hours and then in an air atmosphere oven at about 130° C. for about 10 minutes to substantially completely dry the sol. The flakes of AQUA-DAG® E source material seeded with diamond powder were then ground into a fine powder having a diameter of about 38 microns or less (less than 400 mesh) in an agate mortar and pestle. About 2 grams of this powder was mixed with a substantially equal quantity of zirconium hydride powder ((−325 mesh) diameter of about 45 microns or less, 99%, supplied by Alfa, Johnson Matthey Catalog Company, Inc., MA). This powder was ball milled for about 2 hours to form a homogeneous mixture and then pressed into about 6.35 mm (¼ inch) diameter tablets using a stainless steel die, at a pressure of about $6.9 \times 10^5$ Pa.

Two of these tablets were placed into a small graphite crucible, having a diameter of about 2.45 cm and a height of about 2 cm, and covered with a graphite lid. The tablets were then covered with a small quantity of the zirconium hydride powder. The crucible was provided with six, 1 mm wide and 1 mm deep grooves at the top to permit a slow diffusion of gases into and out of the crucible even when covered with the lid.

Figure 7:
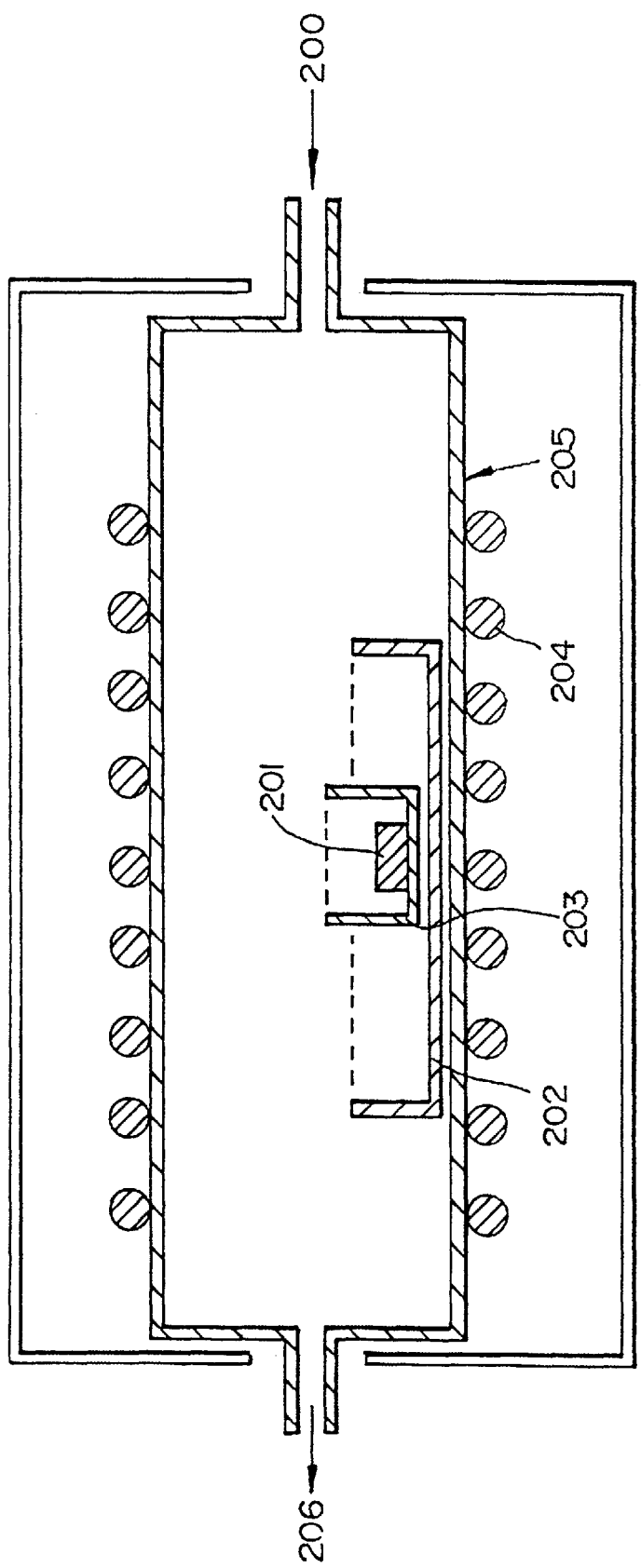
FIG. 7 is a schematic view of the alumina tube furnace which was utilized in Examples 15–17.

As shown in FIG. 7, the crucible was placed into an alumina boat 202 and the alumina boat was placed in the middle of an about 2 inch diameter alumina tube furnace 205 (supplied by Lindberg Co.). The ends of the tube furnace are closed with metallic adaptors with O-rings and additionally, have 1 cm diameter tubes for inlet and outlet of any gas. The furnace inlet 200 was connected to an ultra pure hydrogen gas cylinder through a precision float valve. The outlet tube 206 of the furnace was connected through a bubbler to an exhaust hood. After flowing the ultra high purity hydrogen for about 20 minutes through the furnace tube 205 to displace the air inside substantially completely, the power to the furnace was switched on. The furnace temperature was raised from about room temperature to about 850° C. in about 3 hours. The temperature was then raised to about 935° C. in about 3 hours. After reaching about 935° C., the temperature was increased to about 945° C. in about 24 hours and then raised to about 970° C. in about 6 hours. The furnace temperature was then increased to about 1100° C. and then cooled to about room temperature in about 8 hours. The hydrogen flow was decreased to about 60 bubbles/minute at the start of the heating cycle and maintained at this rate throughout the process. At the end of the process, the alumina boat with graphite crucible was withdrawn from the furnace. The tablets of processed material were taken for x-ray diffraction analysis.

Figure 33:
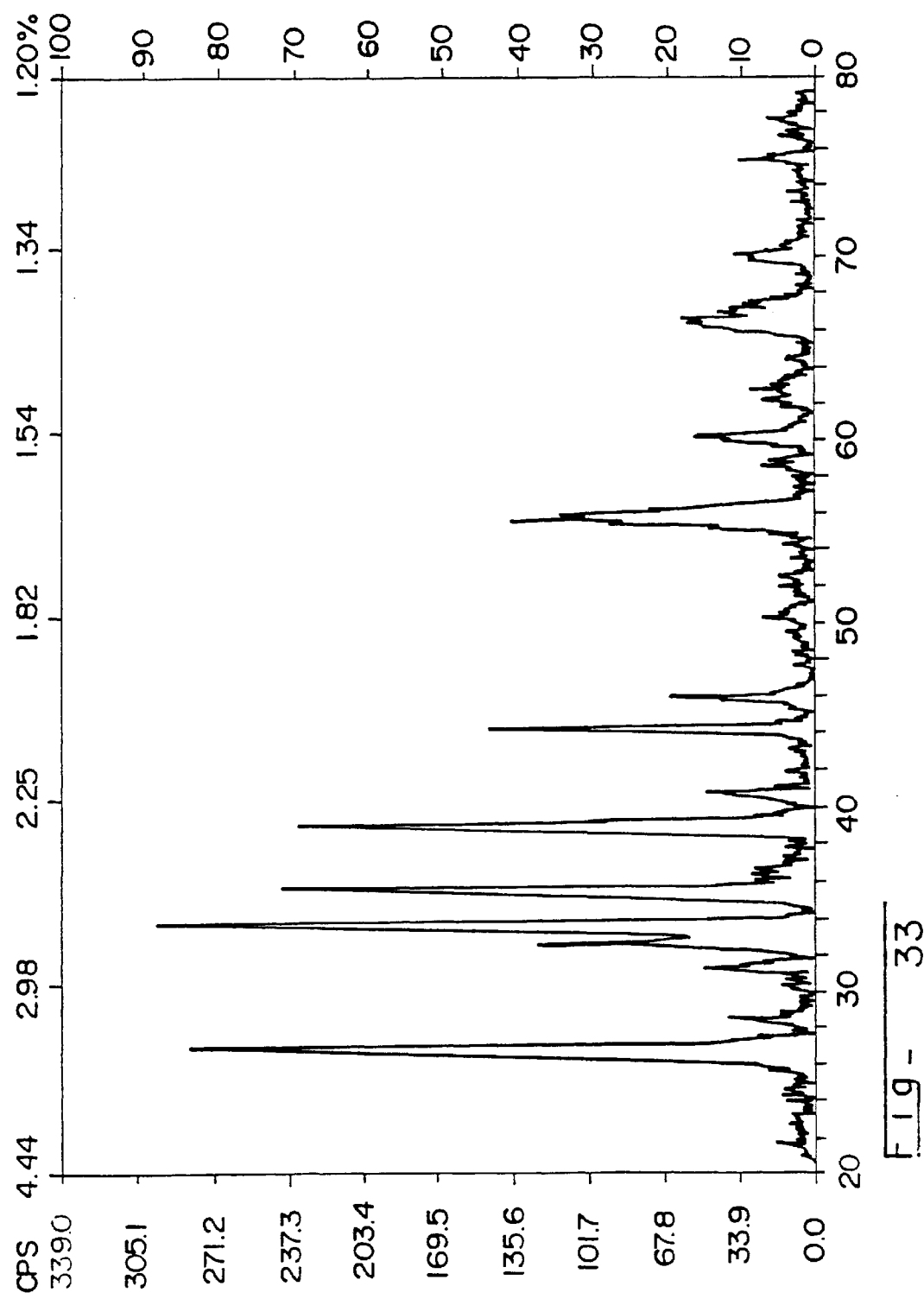
FIG. 33 is an x-ray powder diffraction pattern of the material formed in accordance with Example 15.
Figure 34:
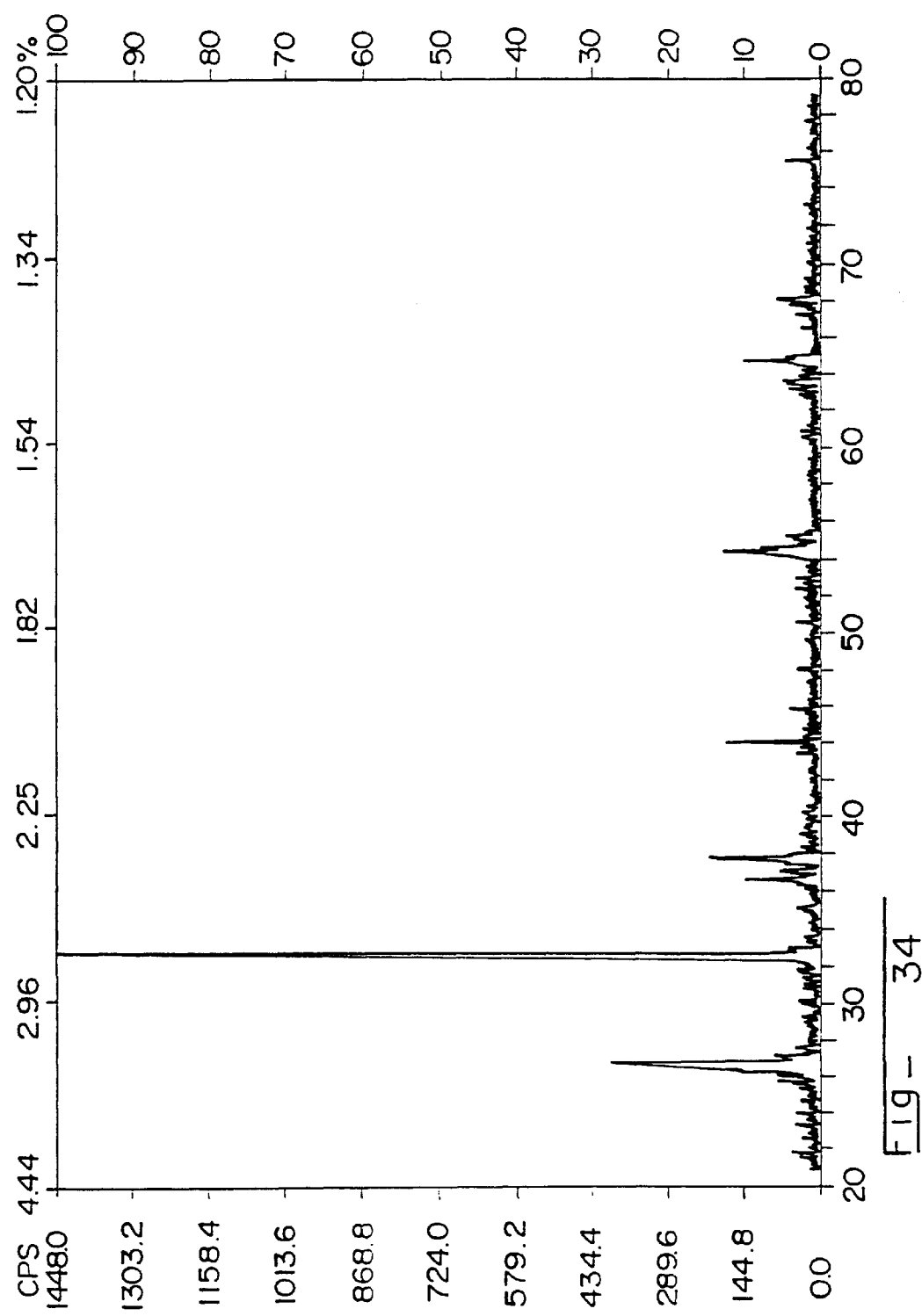
FIG. 34 is an x-ray powder diffraction pattern of the starting materials utilized in accordance with Example 15.

The x-ray diffraction spectrum, shown in FIG. 33, showed a large sharp XRD peak at d=0.2056 nm (2.056 angstrom) which is typical of diamond. The XRD taken for the powder before the process indicated the presence of a very small quantity of diamond seed as shown in FIG. 34.

This indicates a bulk conversion of carbon into diamond.

EXAMPLE 16

The example demonstrated a non-plasma method of forming diamond utilizing glassy carbon as a solid carbon source.

Specifically, the carbon source material comprising glassy carbon was prepared by heat treatment of phenol-formaldehyde resin as described in Example 4, Sample A.

About three grams of the glassy carbon fine powder were weighed in a clean 30 ml Pyrex® glass beaker. To this was added about 0.3 gram of diamond seed (less than 1 micron size, natural, 99.9% supplied by Johnson-Matthey, their Catalog No. 13401), and about 0.305 grams of a PVA solution (5% PVA in deionized water). About 10 ml of deionized water, of resistivity better than 7 M ohm, was added and stirred with a clean stainless steel spatula. This sol was subjected to ultrasonic cleaning in an ultrasonic bath, (a product of Geoscience Instruments Corporation, NY) for about 30 minutes. This homogenized sol was poured into a clean 10 cm diameter petri dish. The dish and its contents was placed in a dust-free cabinet (kept at about 50° C.) for about 12 hours. The dish and its contents was then transferred to an air atmosphere oven at about 130° C. and kept at this temperature for about 15 minutes to substantially completely dry out the deionized water. With a sharp and clean stainless steel blade small platelets of precursor material of about 5 mm×5 mm were cut out and put in a clean graphite crucible and put in an alumina boat.

Figure 35:
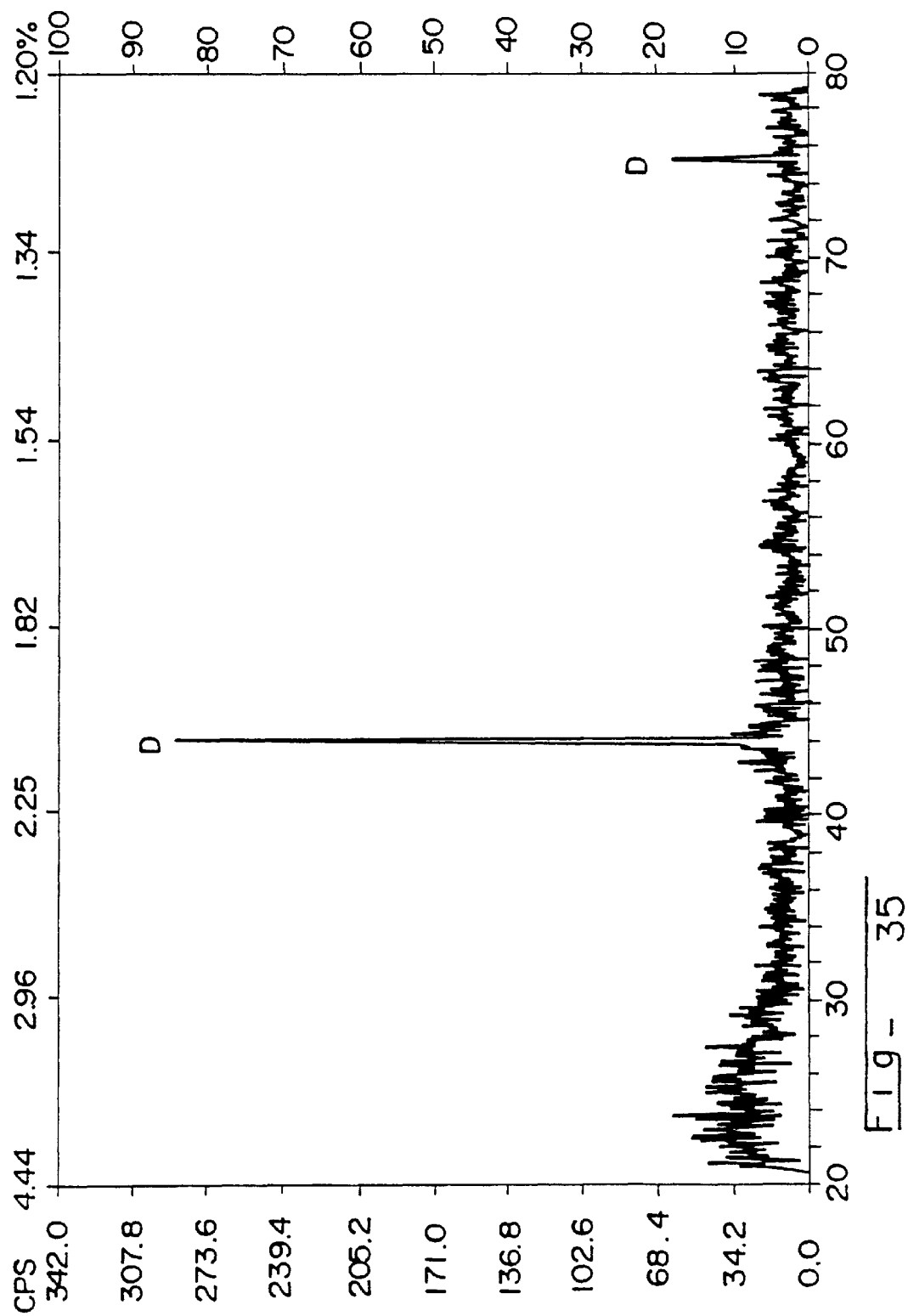
FIG. 35 is an x-ray powder diffraction pattern of the material formed in accordance with Example 16.
Figure 36:
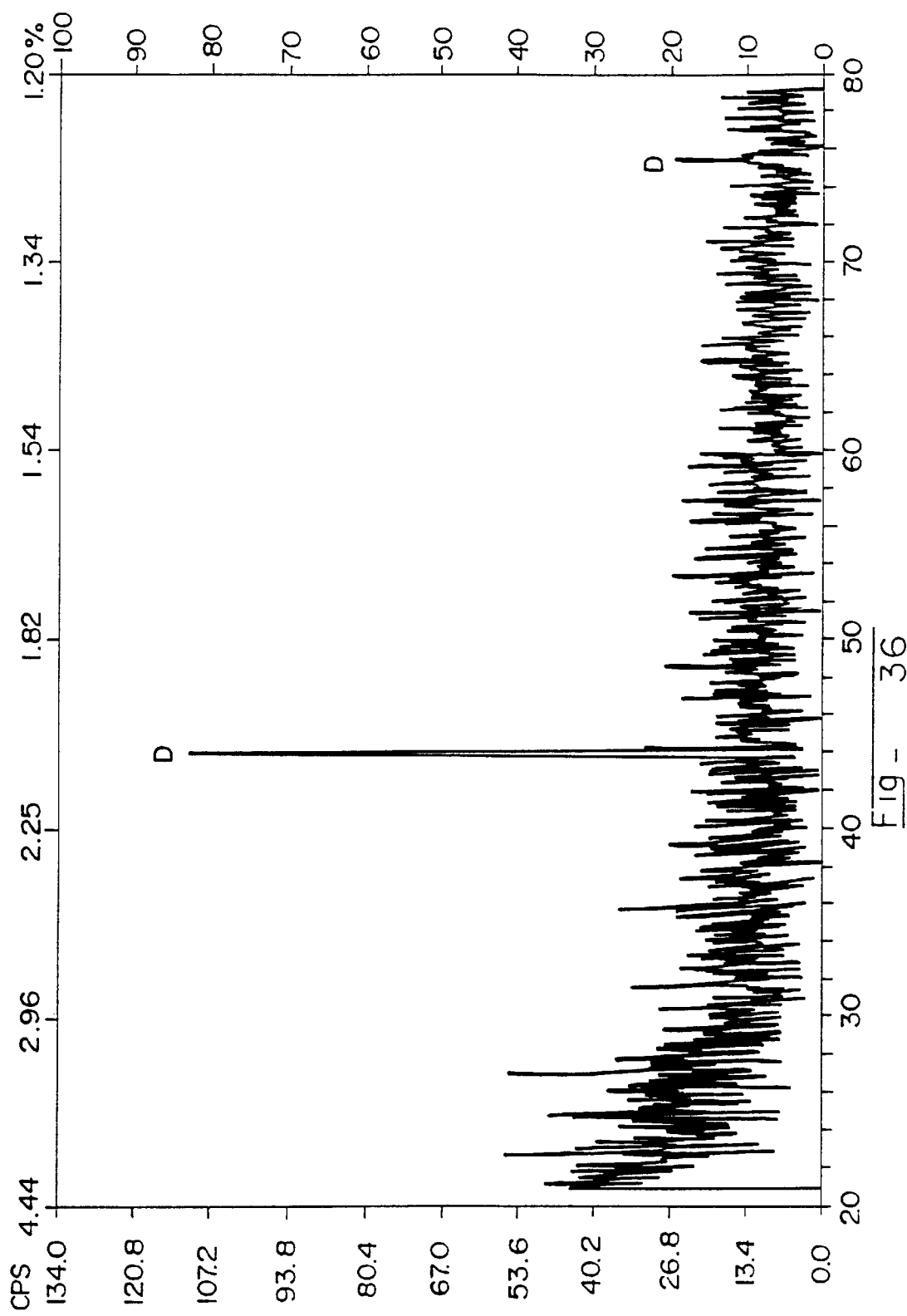
FIG. 36 is an x-ray powder diffraction pattern of the starting materials used in accordance with Example 16.

The boat carrying the crucible was placed in the middle of the conventional controlled atmosphere alumina tube furnace (Lindberg Company) described in Example 15 and shown in FIG. 7. An atmosphere of ultrahigh purity hydrogen was created in the furnace and a flow of about 60 bubbles/minute was adjusted and maintained throughout the process using a precision-leak float-valve. Substantially the same heating schedule used in Example 15 was used in this Example. Upon reaching room temperature, the boat with the crucible containing the processed material was removed from the furnace and the processed material was subjected to x-ray diffraction analysis. FIG. 35 shows very clean and sharp crystalline phase diamond lines at 2.059 and 1.260. The relatively low count of the same lines in FIG. 36 showing XRD of the precursor material before processing indicates that the process has increased the diamond content appreciably.

EXAMPLE 17

This example demonstrates a method for forming diamond by utilizing an internal atomic hydrogen source by a non-plasma assisted conversion.

The process described in Example 15 was repeated with the difference that instead of ultrahigh purity hydrogen, ultrahigh purity argon was used to supply the atmosphere inside the furnace. The processed material showed a good conversion into diamond crystals.

As a further aspect of the invention it should be noted that different inert gases in combination with different seed materials, carbon source materials, and internal sources of atomic hydrogen may produce different morphologies of diamond crystals and give different conversion rates.

What is claimed is:

1. A method for making diamond comprising:
   mixing together at least one non-vapor phase carbon source material and at least one material comprising at least one metal hydride, wherein said metal hydride comprises at least one material selected from the group consisting of lanthanum hydrides, tantalum hydrides, lanthanum-nickel hydrides, zirconium hydrides and titanium hydrides;
   heating said mixture under a pressure not more than about one atmosphere; and
   growing diamond from said mixture.

2. The method of claim 1, further comprising providing an additional atmosphere to assist in growing said diamond.

3. The method of claim 2, wherein said additional atmosphere comprises at least one atmosphere selected from the group consisting of nitrogen, oxygen, carbon, argon and mixtures thereof.

4. A method for making diamond comprising:
   mixing together at least one non-vapor phase carbon-source material comprising at least one material selected from the group consisting of amorphous carbon, glassy carbon, carbon black, carbon powder, carbon fibers, graphite, charcoal, polymer materials containing carbon, colloidal graphite, soot, and organic powders which are capable of being converted to carbon and at least one material comprising at least one metal hydride; and
   heating said mixture under a pressure of not more than one atmosphere; and growing diamond from said mixture.

5. A method for making diamond comprising:
   mixing together at least one non-vapor phase carbon-source material and at least one material selected from the group consisting of nickel, copper, molybdenum, zirconium, platinum, and palladium;
   providing a hydrogen containing atmosphere at a pressure of about $1.01325 \times 10^5$ Pa or less;
   heating said mixture; and
   growing at least one diamond from said mixture.

6. The method of claim 5, wherein said at least one diamond comprises a fiber.

7. The method of claim 5, wherein at least one of said at least one non-vapor phase carbon source material and said at least one material are provided in particulate form.

8. A method for making diamond comprising:
   mixing together at least one non-vapor phase carbon source material and at least one material selected from the group consisting of silicon, cubic boron nitride, silicon carbide and non-diamond materials which approximate the structure and lattice constants of diamond;
   providing an atmosphere comprising hydrogen, said atmosphere being provided at a pressure of not more than about one atmosphere;
   heating said mixture; and
   growing at least one diamond from said mixture.

9. The method of claim 8, wherein said at least one carbon source material comprises a porous material.

10. The method of claim 8, further comprising providing a plasma to assist in production of said at least one diamond.

11. The method of claim 5, wherein said mixture is heated to a temperature range of from about 300° C. to about 2000° C.

12. The method of claim 11, wherein a plasma is provided to assist in the formation of said at least one diamond.

13. The method of claim 5, wherein said at least one non-vapor phase carbon-source material comprises at least one material selected from the group consisting of amorphous carbon, glassy carbon, carbon black, carbon powder, carbon fibers, graphite, charcoal, polymer materials containing carbon, colloidal graphite, soot, and organic powders which are capable of being converted to carbon.

14. The method of claim 8, further comprising growing said at least one diamond in a chemical vapor deposition apparatus which is assisted by at least one apparatus selected from the group consisting of a microwave generator apparatus, a radio frequency generator apparatus, a direct heating apparatus and a filament heating apparatus.

15. The method of claim 14, wherein said chemical vapor deposition apparatus is assisted by a microwave generator apparatus, and wherein a plasma is formed to assist in growing of said at least one diamond.

16. The method of claim 8, wherein said growing of said at least one diamond occurs at a temperature range of about 300° C.–1600° C.

17. The method of claim 8, wherein said growing of said at least one diamond occurs at a temperature range of about 700° C.–1000° C.

18. The method of claim 8, wherein said at least one non-vapor phase carbon source material is provided in particulate form.

19. The method of claim 8, wherein a sol-gel mixture is formed comprising said at least one non-vapor carbon source material and said at least one material.

20. The method of claim 19, wherein said sol-gel mixture is coated onto at least one substrate material.

21. The method of claim 18, wherein said at least one material is provided in particulate form.

* * * * *